United States Patent [19]
Eguchi et al.

[11] 4,381,523
[45] Apr. 26, 1983

[54] AUTOMATIC FOCUSING DEVICE

[75] Inventors: Mitsuo Eguchi, Ageo; Masahito Yoshida, Urawa; Yoshifumi Kato, Oomiya; Nobuyuki Ichino, Warabi; Yoshimi Kikuchi, Kitamoto, all of Japan

[73] Assignee: Mamiya Koki Kabushiki Kaisha, Japan

[21] Appl. No.: 224,464

[22] Filed: Jan. 12, 1981

[30] Foreign Application Priority Data

Jan. 14, 1980 [JP] Japan ................... 55-3233

[51] Int. Cl.³ .............................................. H04N 3/26
[52] U.S. Cl. ................................... 358/227; 354/25
[58] Field of Search ................ 358/227; 354/25, 195, 354/196, 197, 198, 199, 201; 353/101

[56] References Cited

U.S. PATENT DOCUMENTS

3,708,619  1/1973  Martin ................................ 358/227
3,883,689  5/1975  Mansour ............................. 358/227

FOREIGN PATENT DOCUMENTS

55-74270  4/1980  Japan ................................ 358/227

*Primary Examiner*—Michael A. Masinick
*Attorney, Agent, or Firm*—Robert E. Burns; Emmanuel J. Lobato; Bruce L. Adams

[57] ABSTRACT

An automatic focusing device comprises a detector for detecting distributions of the images of an object which are formed by two light beams passing through two different points in a photographing optical system and for providing corresponding video signals. The video signals are processed to obtain an output signal representative of a relative positional relation between the video signals for use in establishing the optical system moving direction and the distance of movement of the focusing position, or to determine only the direction of movement of the optical system so that the optical system is moved in the direction thus determined to the focusing position. The automatic focusing operation can be accomplished without using movable members other than the photographing lens of the optical system, or in the case of using a movable member, the focusing operation can be achieved with high accuracy by operating the movable member only once.

18 Claims, 38 Drawing Figures

(a)

(b)

(a)

(b)

(a)

(b)

FIG. 24
(a) 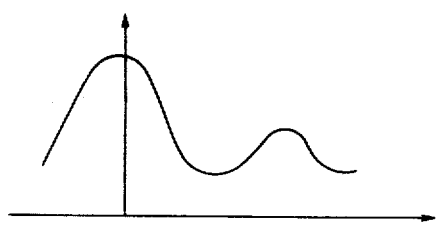
(b) 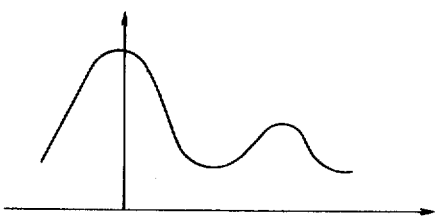
(c) 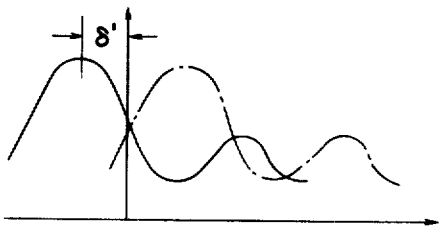
FIG. 25
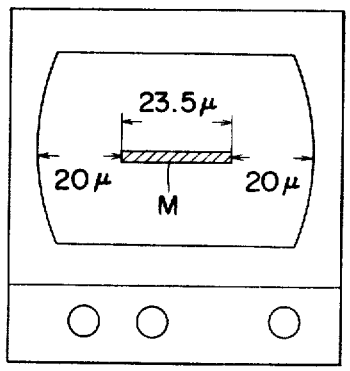

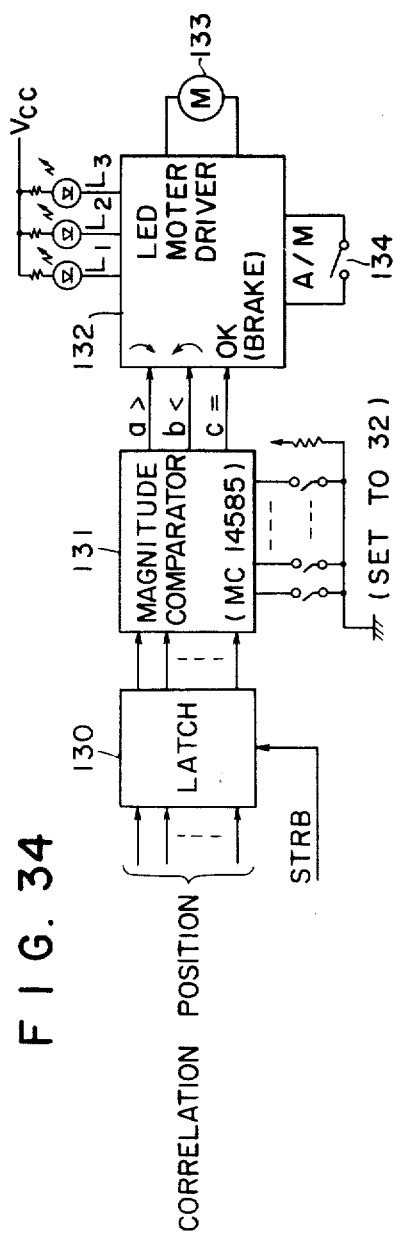
F I G. 34
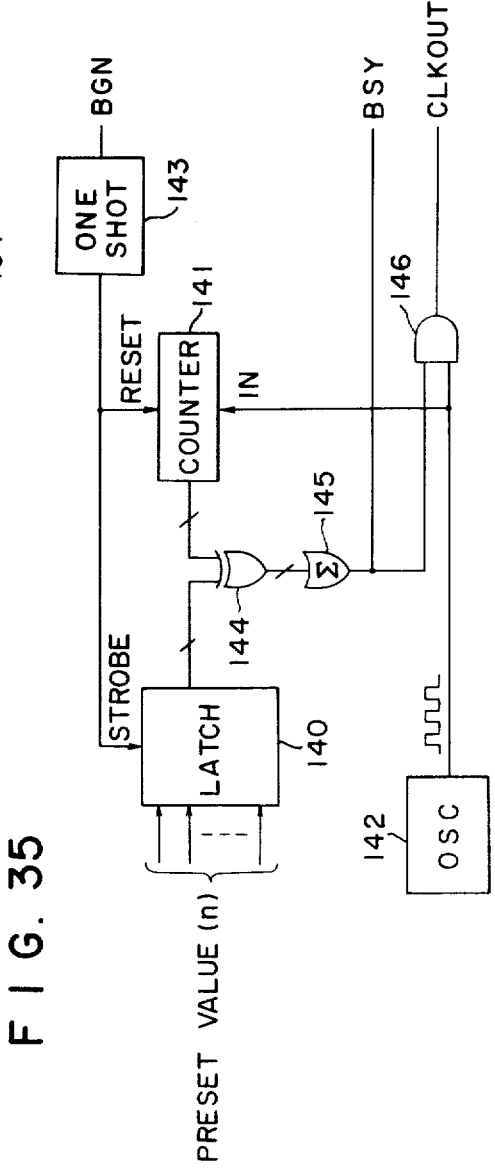
F I G. 35

F I G. 37
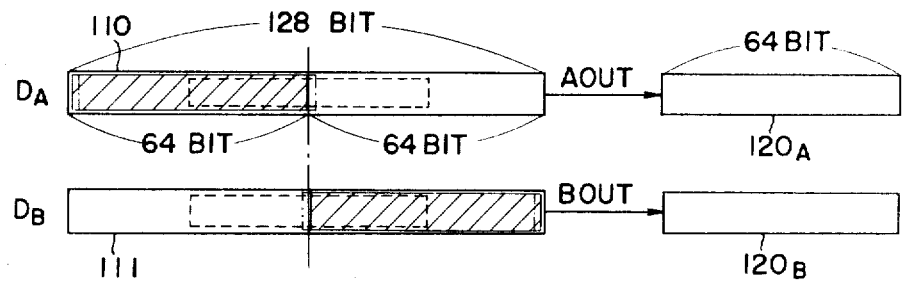
F I G. 38
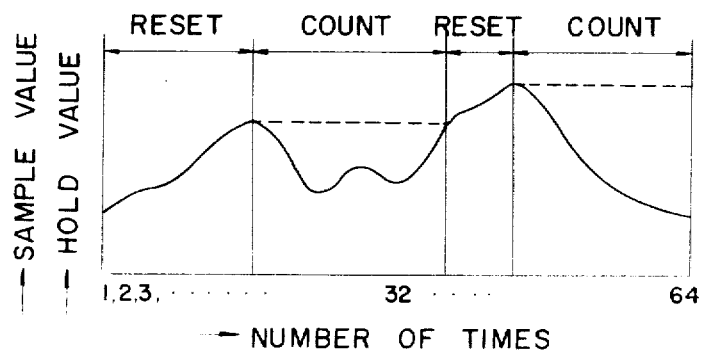

AUTOMATIC FOCUSING DEVICE

BACKGROUND AND SUMMARY OF THE INVENTION

This invention relates generally to single lens reflex cameras, motion picture cameras and video cameras, and more particularly to an automatic focusing device in such photographing devices.

In a photographing operation, focusing and exposure are essential. Owing to the recent electronical development, the exposure can be substantially automatically determined, and accordingly the determination of exposure is not a cause that makes pictures unsatisfactory in quality.

On the other hand, a method of automatically focusing a photographing lens on an object (hereinafter referred to merely as "automatic focusing") is not sufficiently practical in use. A short focal length 35 mm camera for the beginner employing such a method has been proposed in the art. However, the camera is not ideal in that it is low in accuracy, it cannot use an interchangeable lens, and it cannot use a long focal length lens.

Recently, almost all the different types of motion picture cameras have been combined with sound systems. However, it is considerably difficult for a photographer to operate the motion picture camera while controlling both the focusing of the camera and the adjustment of the sound system. Thus, there has been a strong demand for the provision of an automatic focusing device excellent in operability.

In photographing objects with a video camera, a number of factors must be taken into account. For instance, the composition, the movement of a person or persons, and the background must be taken into consideration in operating the video camera. In addition to these factors, the arrangement of color in a natural color image is one of the factors which must be adjusted by the photographer through his experience at all times, because the monitor system of the video camera is a monochrome television receiver.

Recently, the exposure system or mechanism has been improved into an automatic one, and accordingly the photographer can operate a camera more readily. However, it is still considerably difficult for the photographer to precisely control the focusing through the small monitoring finder. Thus, also in this respect, the provision of an automatic focusing device is strongly required.

Automatic focusing devices according to a visitronic module system, an infrared ray system and an ultrasonic wave system are commercially available. Since the automatic focusing devices are not provided according to a system in which the focusing position is detected by utilizing the bundle of rays passing through the photographing optical system (hereinafter referred to as "a TTL system", when applicable), the devices are completely different from an automatic focusing device ideal for the above-described various photographing devices, being disadvantageous in the following points:

(1) The conventional automatic focusing devices are not free from parallax.

(2) Accordingly, it is impossible to display on the finder a part of the object to be photographed on which the photographing lens should be focused.

(3) It is considerably difficult to apply the conventional automatic focusing devices to a photographing device using a photographing lens such as a zoom lens having a focal length variable over a wide range; more specifically to a video camera, a motion picture camera, or a single lens reflex camera using an interchangeable lens.

(4) The conventional automatic focusing devices are low in accuracy.

In view of the foregoing, an object of this invention is to provide an ideal automatic focusing device in which all of the difficulties accompanying a conventional automatic focusing device have been eliminated by employing an automatic focusing method according to the TTL system, and which can be applied to a variety of photographing devices.

On the other hand, a variety of automatic focusing methods for a photographing device such as a motion picture camera or a video camera have been proposed in the art, in which the contrast or the like of the image of an object which is formed by the pencil of rays passing through the photographing optical system is analyzed to detect the focusing condition.

In most of the conventional automatic focusing methods, however, it is difficult to determine the focusing position with respect to the focus detecting plane, i.e. to detect the side of the focus detecting plane on which the focusing position is located.

Furthermore, in many conventional automatic focusing methods one or plural ones of the blade, grid and mirror which are arranged in a photographing system, a light receiving unit and an optical system are made movable, so that the focusing position is detected by vibrating or moving these members, so as to drive the photographing optical system to the focusing position thus detected.

However, these conventional automatic focusing methods are undesirable in that the mechanism is low in durability, the operating speed is also low, and the device itself is rather intricate.

Automatic focusing methods in which such mechanical movable members are eliminated have been proposed in the art. However, in the methods, the realization of the processing system is not taken into account yet, and accordingly it is difficult to practice the methods.

Accordingly, another object of the invention is to provide an automatic focusing device in which all of the above-described drawbacks accompanying a conventional automatic focusing device according to the TTL system have been eliminated.

The nature, principle and utility of the invention will become more apparent from the following detailed description when read in conjunction with the accompanying drawings.

BRIEF DESCRIPTION OF THE DRAWINGS

In the accompanying drawings:

FIG. 24 is an intensity distribution diagram for a description of the defocus detecting principle of the embodiment shown in FIG. 23;

FIG. 25 is an explanatory diagram showing a part extracted from a video signal in the embodiment shown in FIG. 23;

FIGS. 30 through 38 are diagrams for a description of a concrete example of a signal processing circuit in the invention. More specifically, FIG. 30 is a block diagram showing a data detecting circuit, FIG. 31 is a logic circuit diagram showing the relation between signals ST and RDY and a signal RDYW, FIG. 32 is a block diagram showing a shift register section, FIG. 33 is a block diagram illustrating a correlation position detecting section, FIG. 34 is a block diagram showing a motor drive and display section, FIG. 35 is a block diagram showing a clock pulse generating section, FIG. 36 is a block diagram showing a sequence control section, FIG. 37 is an explanatory diagram for a description of the operations of shift registers in a shift register section and a correlator, and FIG. 38 is a graphical representation for a description of the operation of the correlation position detecting section.

DETAILED DESCRIPTION OF THE INVENTION

To facilitate to a full understanding of this invention, first the principle of detecting a focusing position according to the invention will be described.

Figure 1:
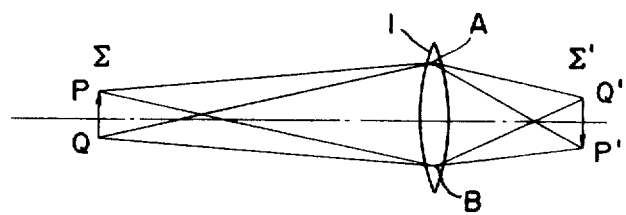
FIGS. 1 through 3 are optical path diagrams for a description of the principle of this invention.

FIG. 1 shows the image $\Sigma^1$ of an object $\Sigma$ which is formed by a lens 1. A light beam from a point P on the object $\Sigma$ which passes through a point A in the upper half of the lens 1 concentrates at a point P' on the image $\Sigma^1$, and a light beam from the point P on the object $\Sigma$ which passes through a point B in the lower half of the lens 1 also concentrates at the point P' on the image $\Sigma^1$.

Figure 2:
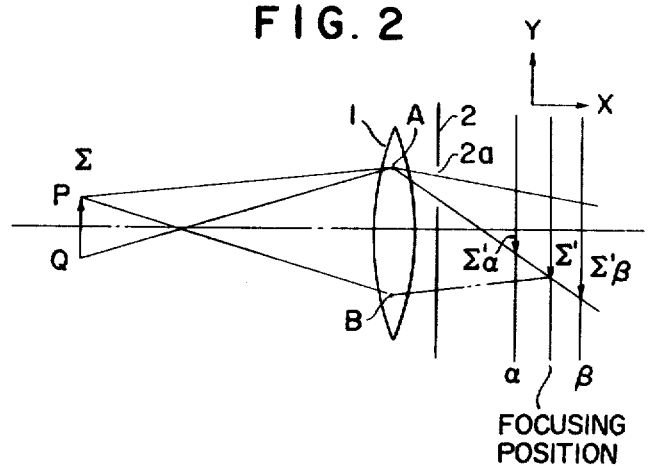

It is assumed that a blade 2 having an aperture 2a is provided as shown in FIG. 2, in order to consider only the image which is formed by the light beam which passes through the point A in the lens 1. In this case, with respect to the image $\Sigma^1$ at the focusing position, an image $\Sigma a$ formed at a defocusing position $\alpha$ is shifted in the positive direction of the Y-axis, and an image $\Sigma^1 \beta$ formed at a defocusing position $\beta$ is shifted in the negative direction of the Y-axis.

Figure 3:
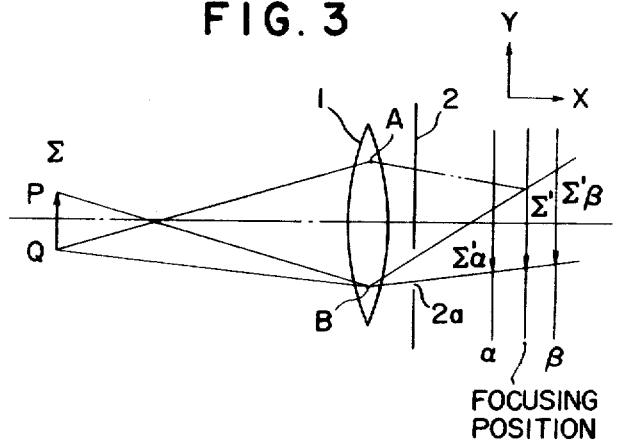

Similarly, it is assumed that the blade 2 is set as shown in FIG. 3, in order to consider only the image which is formed by the light beam which passes through the point B in the lens 1. In this case, with respect to the image $\Sigma^1$ at the focusing position, an image $\Sigma^1 \alpha$ formed at a defocusing position $\alpha$ is shifted in the negative direction of the Y-axis, and an image $\Sigma^1 \beta$ formed at a defocusing position $\beta$ is shifted in the positive direction of the Y-axis.

At the same time, the high frequency components of the images at the defocusing positions $\alpha$ and $\beta$ are lost; that is, the images are foggy, and are low in contrast.

Figure 4:
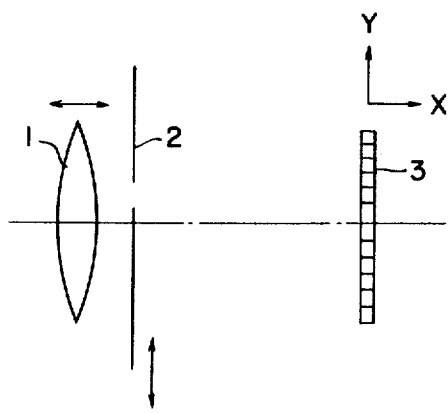
FIG. 4 is an explanatory diagram showing the arrangement of a photographing lens, a blade and a sensor array for detecting the intensity distribution of an object to be photographed.

In order to detect the intensity distribution of the image, an optical sensor array 3 is disposed in the Y-axis direction as shown in FIG. 4.

Figure 5:
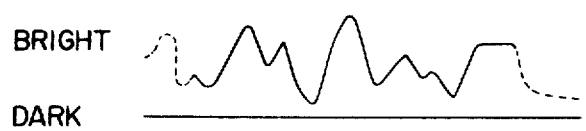
FIG. 5 is a diagram showing the intensity distribution of the object.
Figure 6:
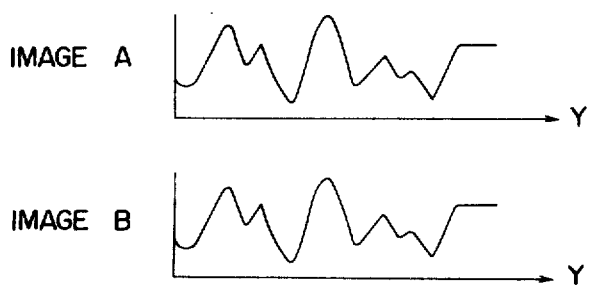
FIG. 6 is a diagram showing the intensity distributions of images A and B when the photographing lens is focused on the object.

If the intensity distribution of the object is as shown in FIG. 5, and the sensor array 3 is set at the focusing position, then both the intensity distribution of the image which is formed by the pencil of rays passed through the point A in the lens 1 (hereinafter referred to as "the image A" when applicable) and the intensity distribution of the image which is formed by the pencil of rays passed through the point B in the lens 1 (hereinafter referred to as "the image B" when applicable) are similar to that of the object in FIG. 1 and are similar in position to one another as shown in FIG. 6.

Figure 7:
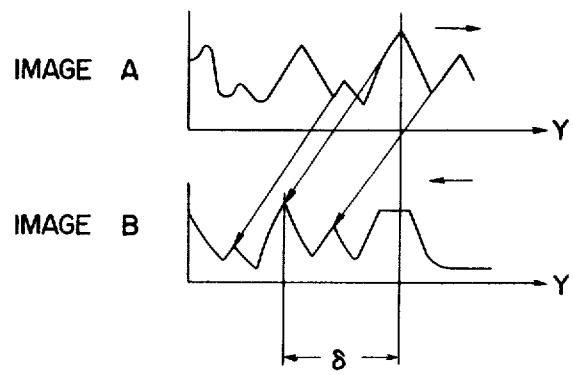
FIG. 7 is a diagram similar to FIG. 6 in the case where the photographing lens is out of focus.

If the sensor array 3 is set at the defocusing position $\alpha$ in FIG. 2 or 3 (or the photographing lens 1 is set closer to the sensor array 3 which is at the correct position), the high frequency components of the image are lost, and as shown in FIG. 7 the image A is shifted in the positive direction of the Y-axis, while the image B is shifted in the negative direction of the Y-axis.

Under the condition that the points A and B are equally spaced from the optical axis, the amounts of shift of the images A and B are equal in magnitude but opposite in direction. Accordingly, the sum $\delta$ of the amounts of shift is twice one of the amounts of shift.

If the sensor array 3 is set at the defocusing position $\beta$ in FIG. 2 or 3 (or the photographing lens 1 is set away from the sensor array 3 which is at the correct position), the images A and B are similarly shifted with the same amount of composite shift δ, but in the directions opposite to those in the above-described case.

If, when with respect to the image A the image B is shifted in the negative direction of the Y-axis, the lens 1 is moved away from the sensor array 3, then the sensor array 3 approaches the focusing plane. If, when with respect to the image A the image B is shifted in the positive direction of the Y-axis, the lens 1 is moved towards the sensor array 3, then the sensor array 3 approaches the focusing plane. Thus, if the sensor array 3 is set in a position in conjugation with a film surface (or an image pickup plane), then a lens driving direction to which the lens is moved for focusing can be detected.

The amount of movement of the lens is related directly to the amount of composite shift δ of the images A and B.

Figure 8:
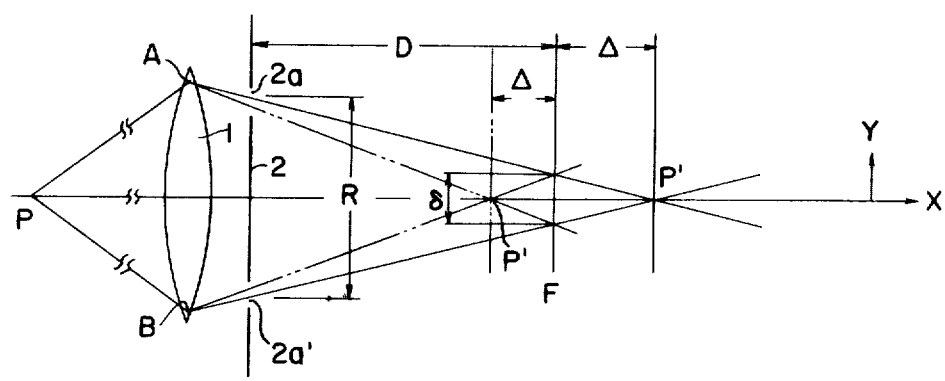
FIG. 8 is an explanatory diagram for a description of a method of calculating a photographing lens moving direction and distance according to the invention.

It is assumed that, as shown in FIG. 8, the image of a point P on the optical axis is formed at a point P' on the optical axis, which is on a plane other than the film surface (or the image pickup plane). In this case, the amount of movement Δ of the lens is:

$$\Delta = -(D\delta/R - \delta|) \qquad (1)$$

where δ is the above-described amount of composite shift, R is the distance between the apertures $2a$ and $2a'$ of the blade 2, and D is the distance between the blade 2 and the film surface F.

If the positive sign (+) is given to δ when with respect to the image B the image A is shifted in the positive direction of the Y-axis, and if the negative sign (−) is given to δ when with respect to the image B the image A is shifted in the negative direction of the Y-axis, then the lens driving direction and distance can be represented by equation (1). That is, the negative (−) Δ means that the lens 1 should be moved in the negative direction of the X-axis (away from the film surface F), and the positive (+) Δ means that the lens 1 should be moved in the positive direction of the X-axis (towards the film surface F).

Thus, the lens driving direction and distance to which the lens is moved for focusing can be detected.

Now, one embodiment of this invention in which the automatic focus adjustment of a single lens reflex camera is carried out according to the above-described method, will be described with reference to FIG. 9.

In order to practice an automatic focusing method according to the invention, it is necessary that the bundles of rays passing through points A and B in a lens 1 are separated without affecting a photographing image to measure the intensity distributions of the images which are formed by the bundles of rays. For this purpose, a half-mirror 4 is disposed between the photographing lens 1 and the film surface F to split a photographing bundle of rays. The bundles of rays passing through the points A and B (hereinafter referred to as "light beams A and B" when applicable) are separated from each other by moving a blade 2 in the direction of the arrow y with a blade driving device 5, in such a manner that the light beams A and B are allowed to pass alternately. Instead of the blade 2, a static shutter such as a liquid crystal, a polarizing filter or a color stripe or color division filter may be employed.

A sensor array 3 is set at a position in conjugation with the position of the film surface F and in a direction corresponding to the Y-axis, to alternately receive the light beams A and B which are separated as described above, to convert the intensity distributions of the images formed by the light beams A and B into electrical video signals (hereinafter referred to as "intensity distribution signals") for detection.

An object is greatly variable in luminance. It is preferable to employ an accumulation mode CCD image sensor array in order to obtain signals in response to the variations in luminance of the object. Accordingly, in this embodiment, a CCD image sensor array is employed as the sensor array 3. The sensor array is driven by a sensor driver 6 (described later in detail) with its charge accumulation time being controlled so as to output serially an intensity distribution signal Sv corresponding to the intensity of each light receiving point over a wide luminance range.

The intensity distribution signal Sv outputted by the sensor array 3 is converted into a binary signal by a binary encoder 7, so that data DA obtained from the light beam A are stored in an A data memory 8A, while data DB obtained from the light beam B are stored in a B data memory 8B.

The correlation of the data DA and DB stored in the memories 8A and 8B is detected by a correlator 9, so as to obtain an amount of composite shift δ between images formed by the light beams A and B (hereinafter referred to merely as "a composite shift δ", when applicable). The composite shift δ is applied to a calculator 10, in which equation (1) is calculated with the above-described constant R (the distance between the centers of the positions on the blade 2 through which the light beams A and B advance) and D (the distance between the blade 2 and the light receiving surface of the sensor array 3), so that the photographing lens (1) driving direction and distance Δ is outputted as an electrical signal ΔV.

The electrical signal ΔV from the calculator 10 is applied to one input terminal of a differential amplifier 11, to the other input terminal of which a voltage signal Vx corresponding to a position of the photographing lens 1 is applied by a position sensor 12. The output of the differential amplifier 11 is utilized to drive the motor M of a lens driving device 13. If the output signal ΔV is negative, then the photographing lens is moved away from the film surface F, and if it is positive, then the lens is moved towards the film surface F.

These operations are controlled by a sequence controller 14. That is, when an automatic focusing operation start switch 15 is turned on, the operations are carried out in the following order. When the operations are completed, the completion thereof is indicated, for instance, by turning on a LED in a display unit. In addition, if the automatic focusing operation is impossible, an impossibility warning indication is displayed on the display unit.

Start switch ON—Blade A side open—Intensity distribution sampling—Binary encoding—A data storage—Blade B side open—Intensity distribution sampling—Binary encoding—B data storage—Correlation detection—Calculation—Lens driving—Completion indication.

Figure 10:
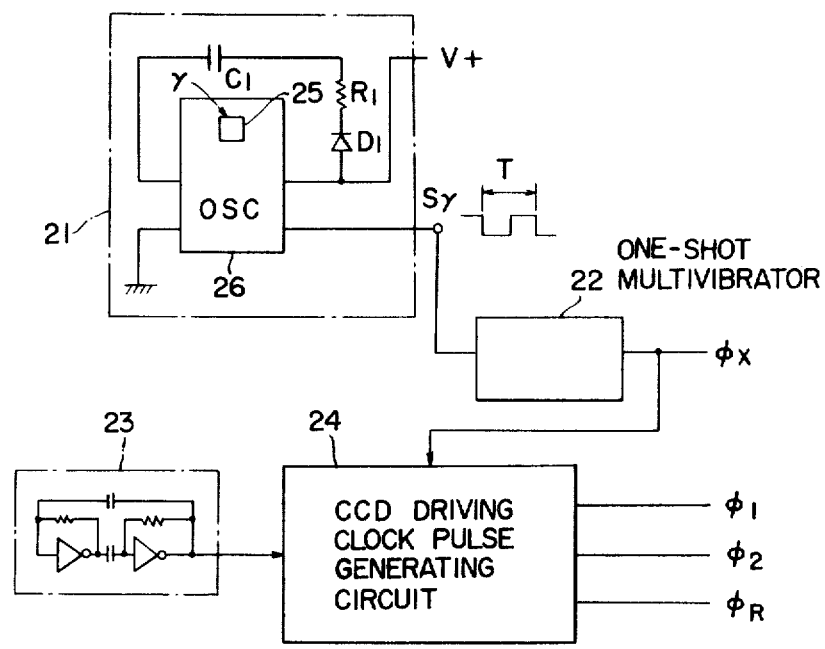
FIG. 10 is a block diagram showing one example of a sensor driver in FIG. 9.

Various circuit elements in the above-described embodiment will now be described in more detail. FIG. 10 is a block diagram showing one example of the sensor driver 6. The sensor driver 6 comprises a light-to-frequency conversion circuit 21, a one-shot multivibrator 22, an oscillator 23 using a CMOS circuit, and a CCD driving clock pulse generating circuit 24.

The light-to-frequency conversion circuit 21 comprises a capacitor C1, a resistor R1, and an oscillator circuit 26 with a photo-cell 25 as a time constant element, to output a square wave signal Sγ whose frequency varies with a quantity of incident light γ. Therefore, the period T of the square wave signal Sγ decreases with an increasing the quantity of incident light γ, or increases with a decreasing quantity of incident light.

Figure 11:
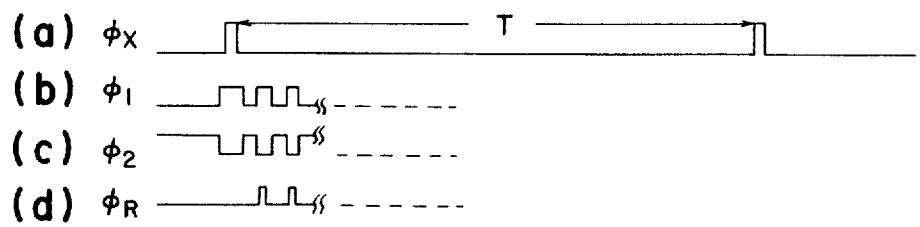
FIG. 11 is a time chart showing the waveforms of various output pulse signals in FIG. 10.

The one-shot multivibrator 22 is triggered, for instance, by the fall of the square wave signal Sγ, to output a shift pulse $\phi_x$ having a predetermined pulse width at a period T as shown in the part (a) of FIG. 11. The period T of the shift pulse $\phi_x$ is the charge accumulation time of the CCD image sensor array 3.

The oscillator 23 applies, for instance, a 2 MHz oscillation output to the clock pulse generating circuit 24, as a result of which the circuit 24 outputs a reset clock pulse $\phi_R$ and transfer clock pulses $\phi_1$ and $\phi_2$ which are two-phase clock pulses opposite in phase as shown in the parts (b) and (c) of FIG. 11. These clock pulses are applied to the sensor array 3.

Figure 12:
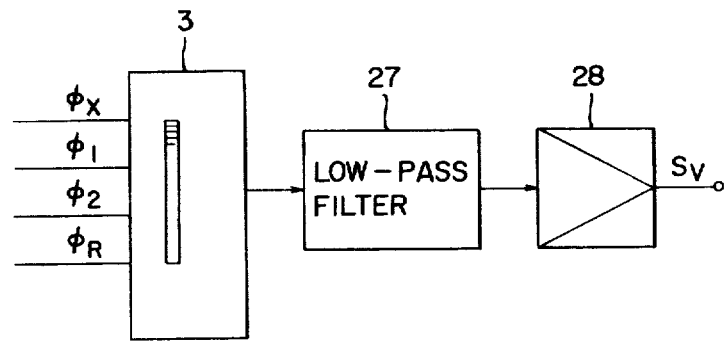
FIG. 12 is a block diagram illustrating a sensor array and a sensor array output signal processing circuit in FIG. 9.

The sensor array 3, as shown in FIG. 12, is driven by the shift pulse $\phi_x$, the transfer pulses $\phi_1$ and $\phi_2$ and the reset pulse $\phi_R$, to successively output signals corresponding to the intensity distribution of the received image. The signals are applied through a low-pass filter 27 to an amplifier 28, to provide the intensity distribution signal Sv.

Figure 13:
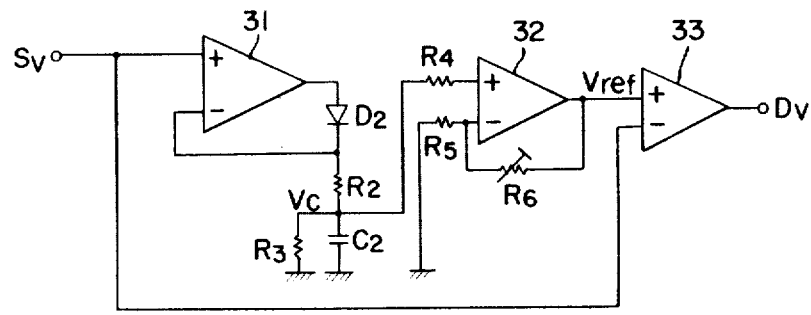
FIG. 13 is a circuit diagram showing one example of a binary encoder in FIG. 9.
Figure 14:
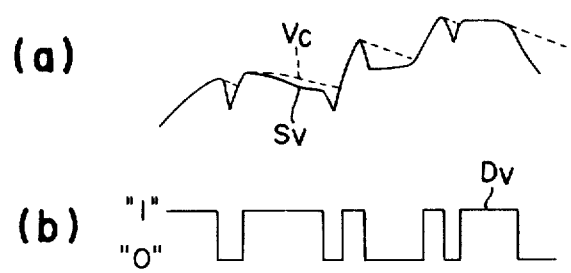
FIGS. 14 through 16 are waveform diagrams for a description of the operation of the binary encoder in FIG. 13.

FIG. 13 shows one example of the binary encoder 7. The peak value of the input signal Sv is held by a circuit made up of an operational amplifier 31, a diode $D_2$, resistors $R_2$ and $R_3$ and a capacitor $C_2$, so that a signal Vc as indicated by the broken line in FIG. 14 is obtained. The signal Vc is suitably amplified by an amplifier circuit made up of an operational amplifier 32 and resistors $R_4$ through $R_6$ to provide a comparison voltage Vref. The comparison voltage Vref is compared with the input signal Sv in a comparator or an operational amplifier 33. When Sv≧Vref, the operational amplifier 33 provides a binary-coded output Dv at a logic level "1", and when Sv<Vref, a binary-coded output Dv at a logic level "0" is outputted, as shown in the part (b) of FIG. 14.

Figure 15:
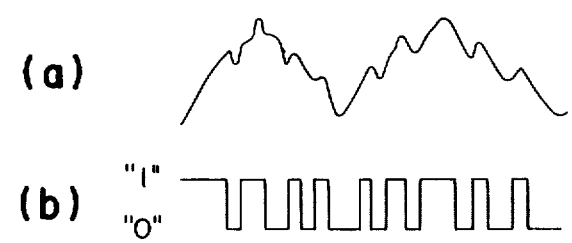
Figure 16:
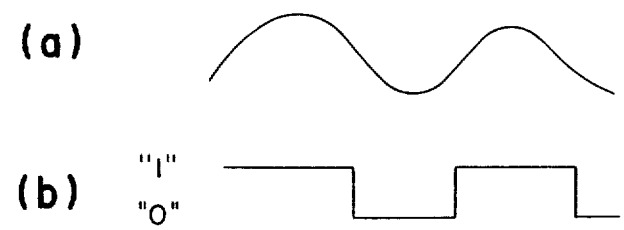

Even if the average level of the input signal Sv is greatly changed, the binary encoder can output the binary coded signal Dv which represents the increase and decrease of its waveform with high fidelity. For the intensity distribution signal which is obtained when the lens is focused on the object (hereinafter referred to as "a focus time" when applicable) as shown in the part (a) of FIG. 15, a binary-coded output as shown in the part (b) of FIG. 15 is provided. For the intensity distribution signal which is obtained when the lens is not focused on the object (hereinafter referred to as "a defocus time" when applicable) as shown in the part (a) of FIG. 16, a binary-coded output as shown in the part (b) of FIG. 16 is provided. Accordingly, the number of pulses in the binary-coded output (or the number of logic levels "1") represent the contrast of the image. Hereinafter, logic levels "1" and "0" will be referred to merely as "1" and "0" respectively, when applicable.

Figure 17:
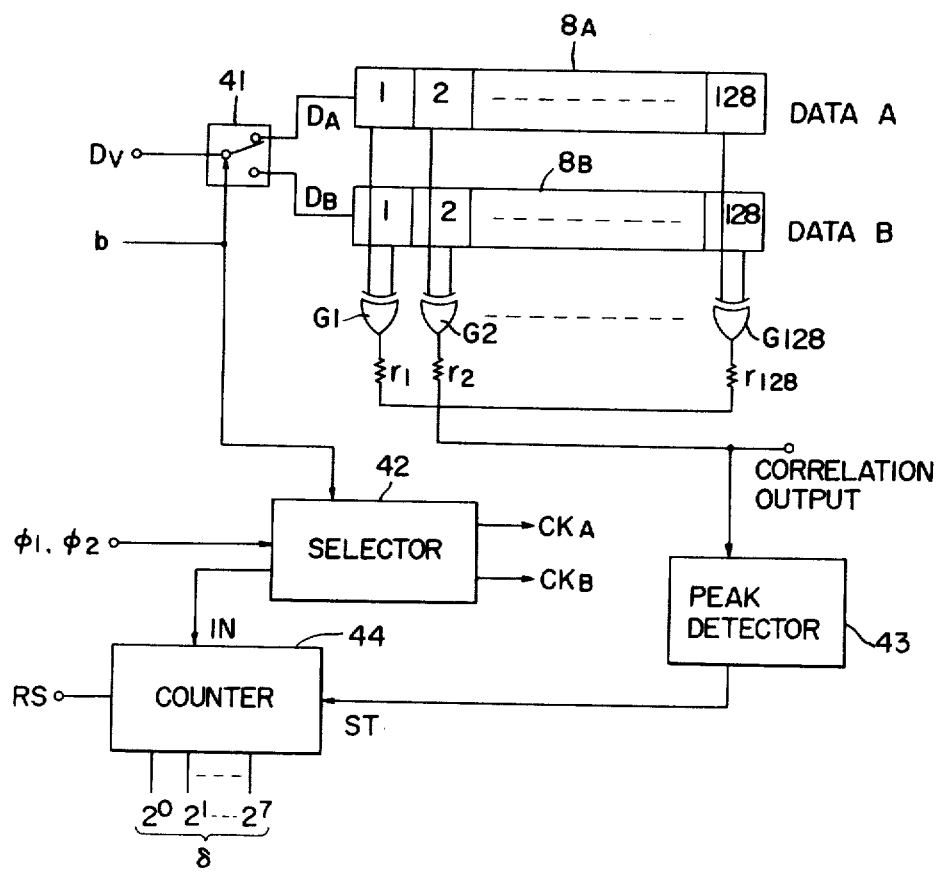
FIG. 17 is a block diagram showing examples of a data memory and a correlator in FIG. 9.

FIG. 17 shows examples of the memories 8A and 8B and of the correlator 9. Each of the memories 8A and 8B uses a ring-shaped shift register which has a capacity of 128 bits by way of example. Selectors 41 and 42 are switched by a blade control signal b so that the binary-coded signal Dv which is obtained when the light beam A is sampled is successively stored as the A data DA in the shift register 8A, and the binary-coded signal Dv which is obtained when the light beam B is sampled is successively stored as the B data DB in the shift register 8B. In this data storing operation, the data transferring transfer clock pulses $\phi_1$ and $\phi_2$ from the sensor array 3 are applied, as shift clock pulses $CK_A$ and $CK_B$, to the shift registers 8A and 8B through the selector 42.

The correlator 9, as shown in FIG. 17, comprises EX-OR circuits $G_1$ through $G_{128}$; resistors $r_1$ through $r_{128}$; a counter 44; and a peak detector 43, to detect the correlation of the A data DA and the B data DB to obtain the aforementioned composite shift δ.

The EX-OR circuits $G_1$ through $G_{128}$ receive the corresponding bit output data of the shift registers 8A and 8B to provide the EXCLUSIVE OR outputs, respectively. Each EX-OR circuit provides an output at "0" when both inputs are at "1" and "1", or "0" and "0" (or coincide in level with each other), and it provides an output at "1" when the two inputs are at "1" and "0", or "0" and "1" (or do not coincide with each other). The sum of the outputs of the EX-OR circuits $G_1$ through $G_{128}$ is obtained with the aid of the resistors $r_1$ through $r_{128}$, thereby to provide the correlation output. For instance, with the shift register 8A maintained stopped, the data DB in the shift register 8B is shifted with the aid of the shift clock pulse $CK_B$, so that the position where the correlation output is maximum is detected by the peak detector 43. Since the shift register 8B is a ring-shaped one as described before, whenever the data is shifted by one bit to the right in FIG. 17, the 128th bit data is shifted to the first (1st) bit position. Accordingly, shifting the data by 65 bit positions to the right is equivalent to shifting the data by 63 bit positions to the left.

On the other hand, the counter 44 is reset by a reset signal RS from the sequence controller (FIG. 9) to start counting pulses synchronously with the shift clock pulses $CK_B$. The counting operation of the counter 44 is suspended by a stop signal ST which is outputted by the peak detector 43 when the detector 43 detects the maximum value. The count value N of the counter 44 at this time instant represents the composite shift δ. However, it should be noted that when N is 65 or larger, the (N-128) represents the amount of composite shift (including the direction).

Figure 18:
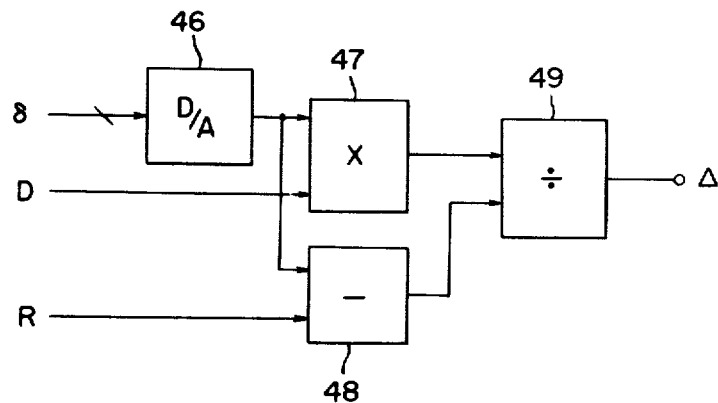
FIG. 18 is a block diagram showing one example of an arithmetic unit in FIG. 9.

The calculator 10, as shown in FIG. 18, comprises a D-A converter 46, a multiplier 47, a subtractor 48 and a divider 49. The D-A converter 46 operates to convert the amount of composite shift δ represented by the count value of the counter 44 into an analog value corresponding to a value which is obtained by multiplying the data δ by the pitch in arrangement of the light receiving elements in the sensor array 3. The multiplier 47 carries out a calculation (D×δ), and the subtractor 48 carries out a calculation (|R×δ|). The divider 49 carries out a calculation (Dδ|R×δ|) to obtain the photographing lens driving direction and distance Δ. This data Δ is outputted as a voltage signal, or an analog signal ΔV.

These analog calculators may be replaced by a microcomputer. In this case, the constants D and R are inputted after being digitalized, and the count value is inputted, as it is, as the data δ to the microcomputer, so that after a digital processing operation, a digital-to-analog conversion is carried out to obtain an analog output. Alternatively, a calculating LSI (a chip for a portable calculator) which has been developed recently may be employed.

Figure 9:
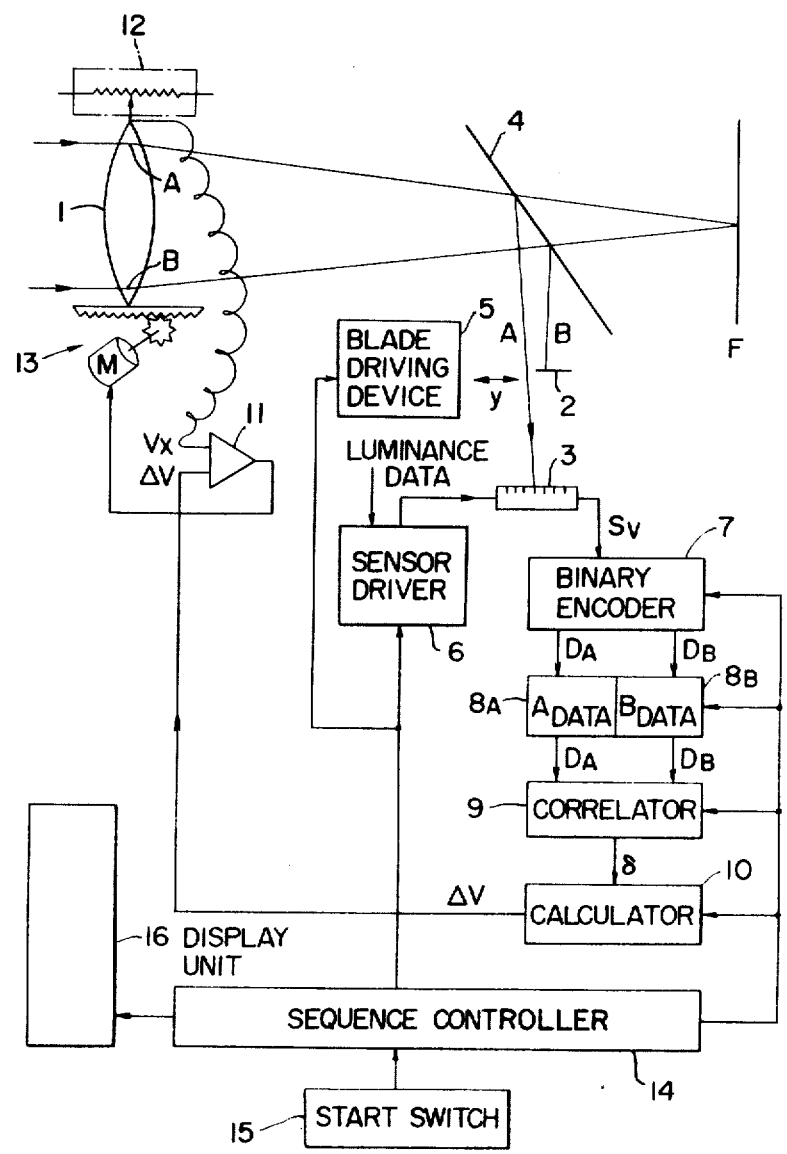
FIG. 9 is an explanatory diagram, partly as a block diagram, showing the entire arrangement of one embodiment of this invention.

With the aid of the analog signal ΔV thus obtained, the photographing lens 1 is moved a required distance in a required direction to form the image on the film surface F, through the differential amplifier 11 and the lens driving device 13 in FIG. 9.

Alternatively, a direction in which the photographing lens 1 should be moved is detected from the sign (+ or −) of the analog signal ΔV, so that while the photographing lens 1 is being moved in the direction thus detected, the number of pulses in the binary-coded output DA or DB from the binary encoder 7 is subjected to comparison and the photographing lens is stopped when the maximum number of pulses (the peak) is obtained.

In order to obtain the focusing position more quickly, it is desirable that the motor is so designed that it can be quickly braked, so that when the photographing lens 1 is set at the focusing position, it may be further moved or vibrated because of its inertia.

The best performance is obtained by controlling with a microcomputer (hereinafter referred to as "a CPU" when applicable) all of the functions of the sequence controller, the correlator, and the calculators, and, if necessary, the above-described contrast check and display timing. With the CPU, the contrast can be readily checked, the automatic focusing operation can be accomplished with high accuracy, and when the automatic focusing operation is impossible, the warning can be readily achieved.

Figure 19:
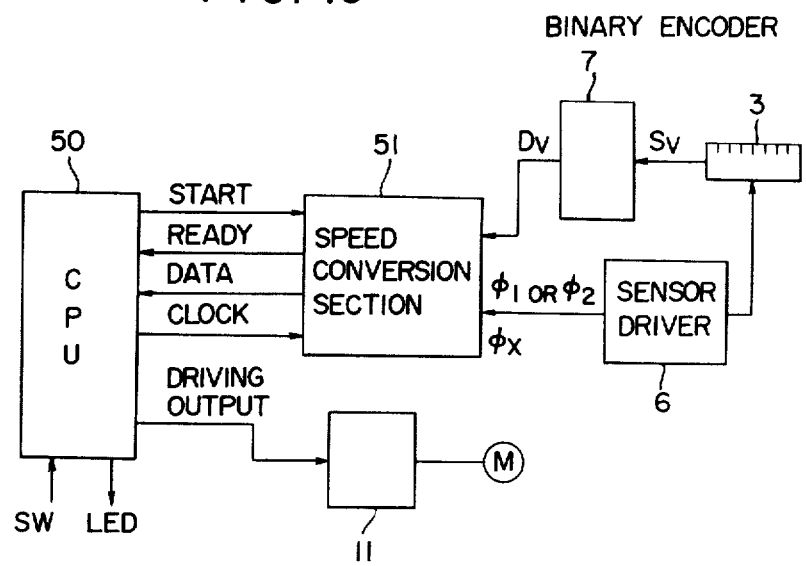
FIG. 19 is a block diagram showing another embodiment of the invention in which a microcomputer is employed.

FIG. 19 is a block diagram showing another embodiment of the invention, which utilizes a CPU. In FIG. 19, those components which have been described with reference to FIG. 9 are therefore similarly numbered, and the optical system is not shown.

In this embodiment, in order to load the binary-coded output Dv from the binary encoder 7 into the CPU 50, it is necessary to provide a speed conversion section 51 as a CPU interface, because the data reading speed of the sensor driver 6 at which the latter 6 reads data from the sensor array 3 is faster than the data processing speed of the CPU 50.

Figure 20:
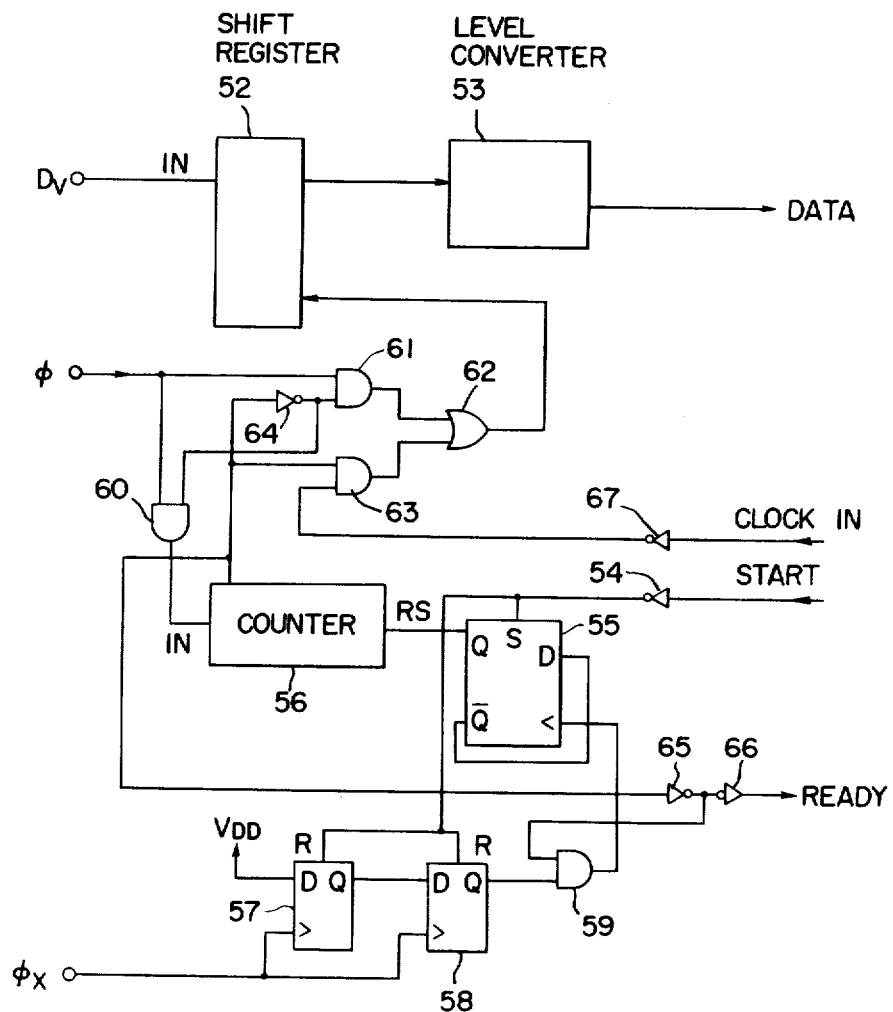
FIG. 20 is a block diagram showing a speed conversion section in FIG. 19.
Figure 21:
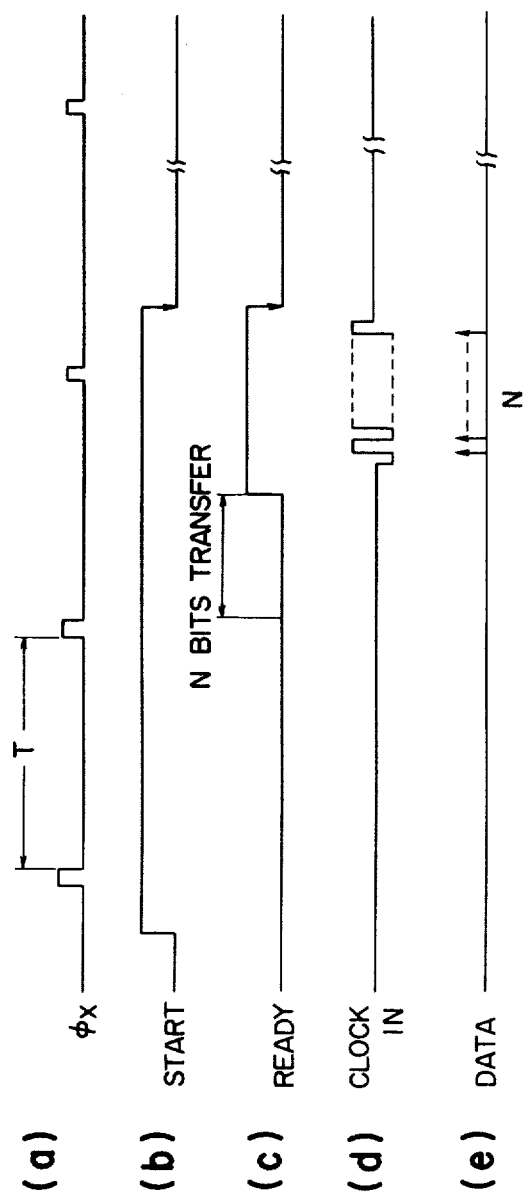
FIG. 21 is a waveform diagram for a description of the operation of the circuit in FIG. 20.

The speed conversion section 51 is arranged as shown in FIG. 20. An image distribution is sampled during an accumulation time T immediately after a start instruction signal is outputted from the CPU as shown in the part (a) of FIG. 21. When the data Dv transferred from the sensor array with the aid of a transfer clock pulse $\phi$ ($\phi_1$ or $\phi_2$ in FIG. 11) and binary-coded is stored by N bits (for instance 128 bits) in the shift register beginning with the time instant that the next shift clock pulse $\phi_x$ is inputted, a ready signal is raised to a high logic level (hereinafter referred to merely as "H", when applicable) as shown in the part (c) of FIG. 21. Thereafter, whenever a clock pulse as shown in the part (d) of FIG. 21 is applied by the CPU, the shift register 52 outputs a one-bit data, which is applied through the level converter 53 to the CPU.

The operation of the speed conversion section 51 will be described with reference to FIG. 21 in more detail.

Before the start instruction signal is outputted to the CPU 50 (FIG. 19) (or being raised to "H"), the output of the inverter 54 is maintained at "H" to set the flip-flop circuit 55, and therefore its Q output is at "H" to reset the counter 56. For the same reason, the output of the inverter 54 being at "H", the flip-flop circuits 57 and 58 are maintained reset.

When the start instruction signal is inputted to the inverter 54, the output of the inverter 54 is set to "L" to release the set states of the flip-flop circuits 57 and 58. Accordingly, when the shift clock pulse $\phi_x$ is applied to the flip-flop circuit 57 by the sensor driver (FIG. 10), the Q output of the flip-flop circuit 57 is raised to "H".

When the shift pulse $\phi_x$ is inputted again after the accumulation time T in the part (a) of FIG. 21, the flip-flop circuit 58 is set, and its Q output is raised to "H". This "H" output is applied through an AND gate 59 to the flip-flop circuit 55 to set its Q output to "L". As a result, the reset state of the counter 56 is released to be reading for counting the transfer pulse $\phi$ which is inputted through the AND gate 60.

In this operation, the transfer pulse $\phi$ is applied through the AND gate 61 and the OR gate 62 to the shift register 52, so that the binary-coded data Dv is stored in the shift register 52.

When the count value of the counter 56 reaches N (for instance 128), the output of the counter 56 is raised to "H", as a result of which the AND gate 63 is opened while the output of the inverter 64 is set to "L" to close the AND gates 60 and 61. On the other hand, the ready signal is raised through the inverters 65 and 66 to inform the CPU of the fact that the data is ready for being read. In this case, the data has been stored as much as N bits in the shift register 52.

Thereafter, whenever the clock pulse from the CPU is applied through the inverter 67, the AND gate 63 and the OR gate 62 to the shift register 52, the register 52 outputs one bit of the data which has been stored therein. The one bit output is applied through the level converter 53 to the CPU.

When all the N bits data are loaded into the CPU, the start instruction signal is set to "L". Thus, one data reading operation has been accomplished.

This data reading operation is carried out twice according to the positions of the blade 2 in FIG. 9, so that the A data and the B data are loaded into the registers in the CPU. Thereafter, the blade 2 is released to read binary-coded data which are obtained from all the light beams, so that the contrast can be checked according to the number of pulses in each sampling period.

Another embodiment of the invention, in which the technical concept of the invention is applied to a still camera, a motion picture camera or a video camera using a zoom lens which provides substantially parallel rays in a part of the optical system at the focus time, will be described with reference to FIG. 22.

A three-group zoom lens is made up of a focus lens 71, a variable magnification lens 72 and an image forming lens 73. At the focus time, parallel rays are provided between the lenses 72 and 73.

A prism spectroscope 74 having a half-mirror surface 74a is interposed between the variable magnification lens 72 and the image forming lens 73 in the zoom lens, to allow a part of the photographing pencil of rays to advance downwardly. Detecting lenses 75A and 75B equivalent to the lens 73 are arranged, and sensor arrays 3A and 3B are disposed, at a position in conjugation with the position of a film surface F, as shown in FIG. 22.

The lens 75A forms on the sensor array 3A the image of the object by using a light beam A which passes through the upper half of the focus lens 71, while the lens 75B forms on the sensor array 3B the image of the object by using a light beam B which passes through the lower half of the focus lens 71. In FIG. 22, reference numeral 76 designates a light shielding plate which is provided so that the two light beams A and B do not interfere with each other.

In this embodiment, unlike the above-described embodiment, a movable member such as the blade is not used. That is, the intensity distribution data of the image formed by the light beam A and of the image formed by the light beam B can be simultaneously sampled for comparison. Therefore, the embodiment is advantageous in that it is excellent in durability and high in operation speed.

The optical axes of the detecting lenses 75A and 75B pass the centers of the sensor arrays 3A and 3B and further pass points A and B in the focus lens 71, respectively. Therefore, the distance between the points A and B is R in equation (1) described before, and the distance between the film surface F and the plane which includes the two points A and B is D in equation (1).

The method of processing the intensity distribution signals provided by the sensor arrays 3A and 3B, and the operation wherein the focus lens 71 is moved by a lens driving device 13 according to an analog signal $\Delta V$ which is obtained from the intensity distribution signal thus processed are similar to those described before.

In a method in which only the direction of movement of the focus lens 71 is detected, so that while the lens 71 is being moved in the direction, the contrast is checked, and when the contrast is checked optimum (or when the number of pulses in the binary-coded data is maximum), the lens is stopped, then it is unnecessary to provide a position sensor 12.

It goes without saying that, in the case of a video camera, the light receiving surface of an image pickup tube or an image pickup element is placed at the position of the film surface F.

Another embodiment of the invention, in which the technical concept of the invention is applied to a video camera, will be described with reference to FIG. 23.

Figure 23:
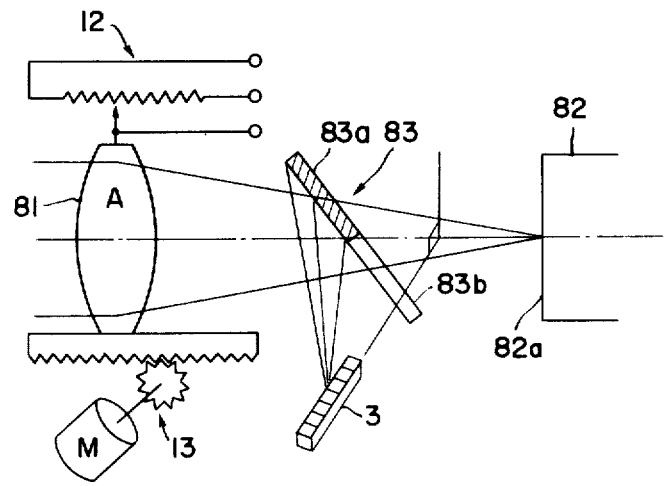
FIG. 23 is a diagram showing the arrangement of an optical system in another embodiment of the invention in which the technical concept of the invention is applied to a video camera.

As shown in FIG. 23, a light beam splitter 83 is interposed between a photographing lens 81 and an image pickup tube (or an image pickup element) 82 in such a manner that it forms a predetermined angle with respect to the optical axis. The upper half of the light beam splitter is a half-mirror 83a, and the lower half is a transparent glass plate 83b. Therefore, the lower half of the light beam splitter may be eliminated.

A sensor array 3 is disposed at a position which is in conjugation with the position of the image pickup surface 82a of the image pickup tube 82 with respect to the photographing lens 81, in such a manner that it is perpendicular to the optical axis. Accordingly, a part of the light beam which passes the upper half A of the photographing lens 81 is split by the half-mirror 83a of the light beam splitter 83 and is then received by the sensor array 3.

Thus, the sensor array 3 can detect the intensity distribution of the image which corresponds to the image of the object which is formed by the light beam A in the above-described embodiments.

On the other hand, instead of the object's image formed by the light beam B in the above-described embodiments, of the image formed on the image pickup tube 82 by the entire light beam passing through the photographing lens 81, a part corresponding to the sensor array is subjected to intensity distribution extraction, so that the resultant intensity distribution is compared with the intensity distribution data which is provided by the sensor array.

In the case where the intensity distribution of the object is as shown in the part (a) of FIG. 24 for instance, the entire light beam passing through the photographing lens 81 is used to allow the image pickup tube 82 to form the image of the object. Therefore, even if the photographing lens is out of focus, the intensity distribution is maintained unchanged in phase as shown in the part (b) of FIG. 24, but the high frequency components are eliminated. On the other hand, the image on the sensor array 3 is formed only by the light beam which passes through the upper half of the photographing lens. Accordingly, similarly as in the case of FIG. 7, when the lens is out of focus, the intensity distribution is shifted to the right or to the left, and the high frequency components are lost.

Accordingly, if the amount of shift $\delta$ of the image detected by the sensor array 3 with respect to the image formed by the image pickup tube 82 is detected, then a front focus or a rear focus can be determined, and accordingly the photographing lens (81) driving direction towards the focusing position can be determined.

For this purpose, as shown in FIG. 25, out of the video signal of the image pickup tube 82, a signal corresponding to the substantially central part of the screen is extracted; for instance, a signal corresponding to a part of 23.5 $\mu$s which is obtained by eliminating both end parts of 40 $\mu$s from one horizontal scanning period substantially in the middle of the vertical scanning period is extracted.

Figure 26:
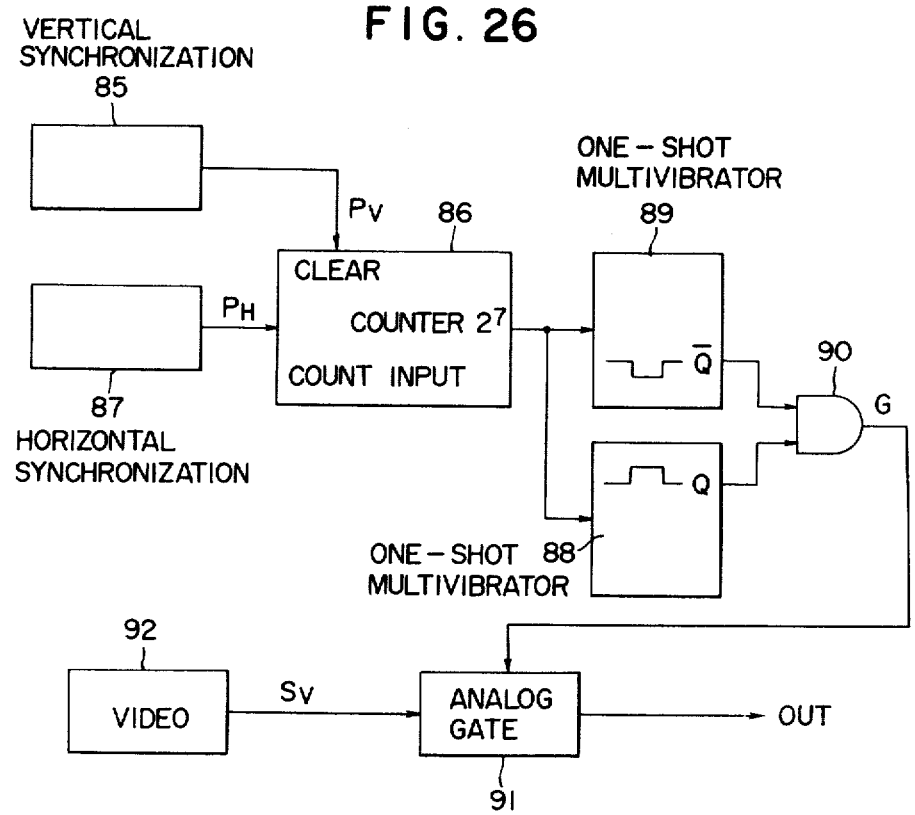
FIG. 26 is a block diagram showing an extraction circuit in the embodiment in FIG. 23.

This signal extracting circuit is as shown in FIG. 26. A counter 86 is cleared by the output vertical synchronizing signal PV of a vertical synchronizing circuit 85 so as to count the output horizontal synchronizing signal PH of a horizontal synchronizing circuit. When the count value of the counter 86 reaches $2^7$ (=128), the output of the counter 86 is raised to "H" to trigger one-shot multivibrators 88 and 89.

Figure 27:
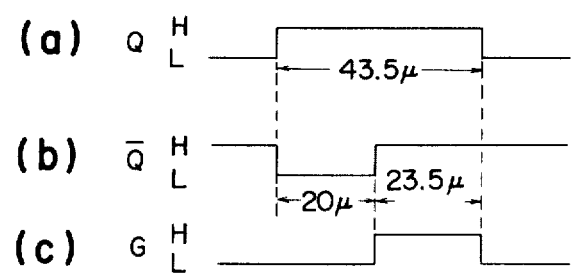
FIG. 27 is a waveform diagram for a description of the operation of the extraction circuit in FIG. 26.

As a result, the Q output of the one-shot multivibrator 88 is maintained at "H" for 43.5 $\mu$s as shown in the part (a) of FIG. 27, while the Q output of the one-shot multivibrator 89 is maintained at "L" for 20 $\mu$s as shown in the part (b) of FIG. 27.

Accordingly, the output G of an AND gate 90 is at "H" for 23.5 $\mu$s after 20 $\mu$s has passed in the 128th horizontal scanning period. For this period (23.5 $\mu$s) an analog gate 91 is opened to pass the video signal Sv of the image pickup tube 82 (FIG. 23) from a video circuit 92.

The 128th horizontal scanning is substantially in the middle of 262.5 horizontal scannings in one vertical scanning period in the interlaced scanning.

The thus extracted video signal of the image pickup tube 82 and the intensity distribution signal provided by the sensor array are correctly binary-coded according to the rise and fall of the waveform by the binary encoder shown in FIG. 13 in a manner as described with reference to FIGS. 14 through 16, similarly as in the above-described embodiments.

The data thus binary-coded are stored in the shift registers 8A and 8B in FIG. 17, respectively, and the output bit data of the shift registers are applied to the respective EX-OR circuits. While the sum of the outputs of the EX-OR circuits is being checked by the peak detector, the data is shifted successively in the shift register in which the output data of the sensor array 3 is stored. The shift register is ring-shaped so that the top bit data overflowing is returned to the last bit position, as described before. On the other hand, the counter counts the shifting clock pulse, and the counting operation of the counter is stopped when the peak detector detects the maximum value. These operations are the same as those of the correlator in the above-described embodiment (FIG. 17).

The direction of shift of the image detected by the sensor array 3 can be determined, i.e. a front focus or a rear focus can be detected according to whether or not the count value of the counter at the time instant (when the counting operation is stopped) is at least a half of the total number of bits in the shift register. Accordingly, the direction of movement of the photographing lens 81 can be determined.

While the photographing lens 81 is being moved towards the focusing position by turning the motor of the lens driving device 13 in the required direction, the contrast is checked with the aid of the video signal of the image pickup tube 82. If, when the contrast becomes optimum, the photographing lens 81 is stopped, when the lens is at the focusing position.

The contrast can be checked according to the above-described method in which the number of pulses in a pulse train obtained by binary-coding the video signal is counted for every frame and is subjected to comparison, so as to detect the time instant when the number of pulses thus counted is maximum. That is, the contrast can be checked by detecting the maximum number of pulses.

Figure 28:
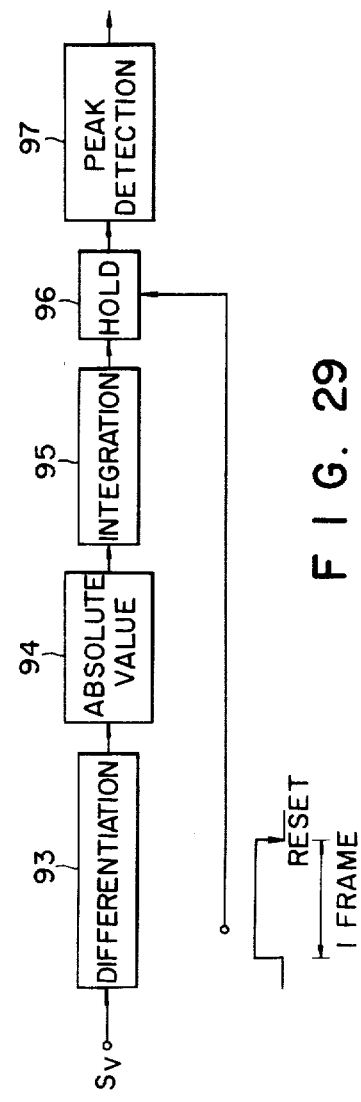
FIG. 28 is a block diagram showing a contrast check circuit.

Alternatively, a contrast check circuit as shown in FIG. 28 may be employed to check an analog signal as it is.

The contrast check circuit is made up of a differentiation circuit 93, an absolute value circuit 94, an integration circuit 95, a hold circuit 96 and a peak detecting circuit 97.

The video signal Sv is applied to the differentation circuit 93, where its variation component is detected. The output of the differentiation circuit 93 is applied to the absolute value circuit 94, in which the negative component of the video signal is converted into a positive component. The output of the absolute value circuit 94 is integrated by the integration circuit 95 and is then held by the hold circuit 96 for one frame period. The final integration value of one frame is stored in the peak detecting circuit 97 at all times, and it is compared with the final integration value of the succeeding frame to detect the peak value.

In the case of a foggy image, the high frequency components of the video signal Sv is less. Therefore, the differentiation output is low, and accordingly the integration output is also low. As the photographing lens is focused on an object, the high frequency components of the video signal Sv increase. Therefore, the differentiation output is increased, and accordingly the integration output is also increased. Thus, the peak value can be detected at the focus time.

In the case where the photographing lens 81 is stopped with the contrast checked, the provision of the position sensor 12 in FIG. 23 is unnecessary. Similarly as in the above-described embodiment, not only the direction of movement of the photographing lens 81 but also the amount of movement of the same can be calculated from the amount of shift (or the phase difference) between the intensity distribution signals provided by the image pickup tube 82 and the sensor array 3. In this case, while the position is being detected with the position sensor 12, the photographing lens 81 can be moved the calculated distance.

Figure 29:
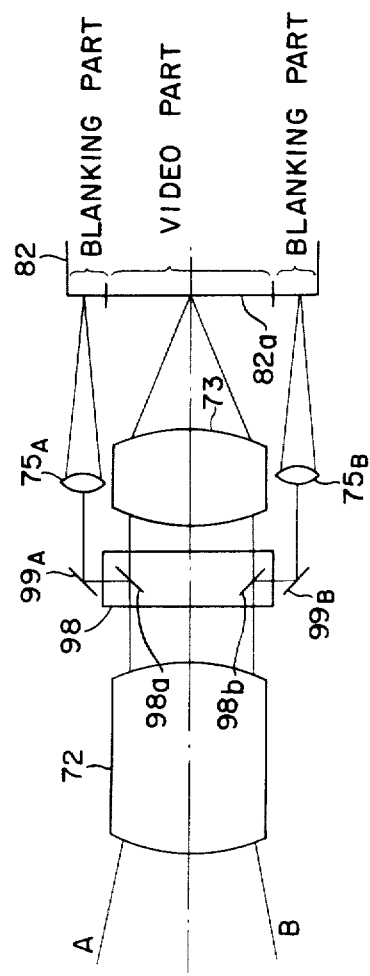
FIG. 29 is a diagram showing the arrangement of another example of the optical system in the embodiment of the invention in which the technical concept of the invention is applied to a video camera.

FIG. 29 shows only the optical system of another embodiment of the invention, in which the technical concept of the invention is applied to a video camera.

Figure 22:
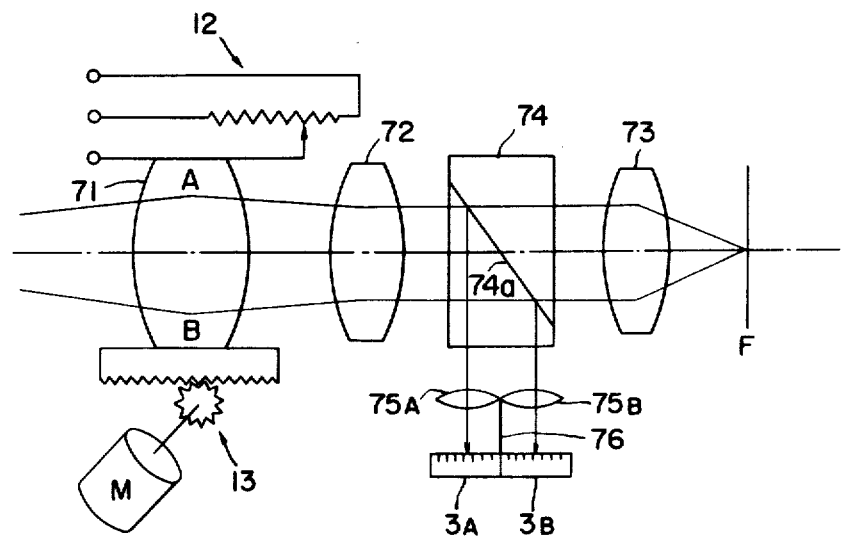
FIG. 22 is a diagram showing the arrangement of an optical system in another embodiment of the invention in which the technical concept of the invention is applied to a camera using a zoom lens.

In this embodiment, similarly as in the embodiment shown in FIG. 22, a zoom lens in a part of which substantially parallel rays are provided at the focus time is used. A spectroscope 98 having two half-mirror surfaces 98a and 98b is interposed between a variable magnification lens 72 and an image forming lens 73. Of the photographing light beam from a focus lens (not shown), a part of a light beam A and a part of a light beam B are directed outwards by the half-mirror surfaces 98a and 98b, respectively. The light beams thus directed are further directed in a direction substantially parallel with the optical axis by mirrors 99A and 99B, so as to be focused on the blanking regions of the image pickup surface 82a of an image pickup tube (or an image pickup element) 82, respectively.

In this case, the intensity distribution data of images formed by the light beams A and B can be provided together with the video signal by the image pickup tube 82, without using a sensor array.

A more concrete example of the signal processing circuit according to the invention will be described with reference to FIGS. 30 through 38.

Figure 30:
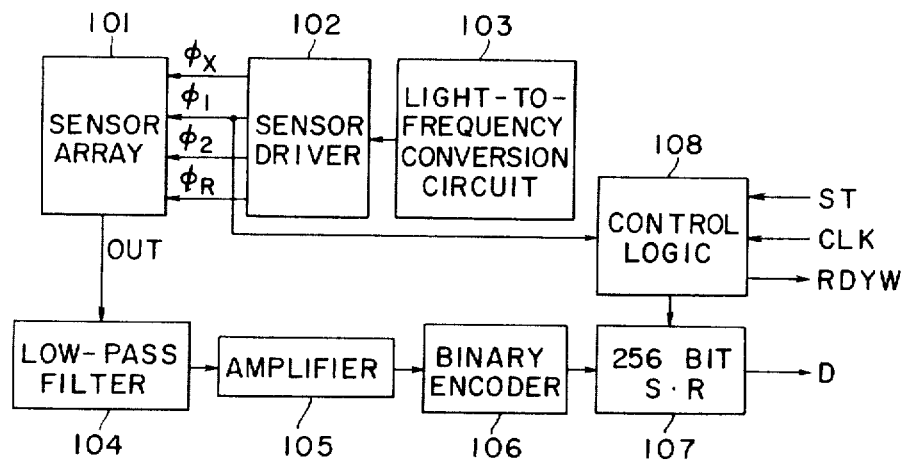

FIG. 30 is a block diagram showing a data detecting section. A sensor array 101 has a 256-bit light receiving element. With the use of an optical system similar to that shown in FIG. 22, one half of the light receiving element, 128 bits, detects the intensity distribution of the image which is formed by the light beam A, while the other half, 128 bits, detects the intensity distribution of the image which is formed by the light beam B. That is, the sensor array 101 is equivalent to the sensor arrays 3A and 3B in FIG. 22.

The sensor array 101 thus organized is driven by a sensor driver 102 the accumulation time of which is controlled by a light-to-frequency conversion circuit 103 which is similar to that in FIG. 10.

In FIG. 30, reference numeral 104 designates a low-pass filter; 105, an amplifier; and 106, a binary encoder similar to that in FIG. 22.

Figure 31:

A shift register 107 and a control logic circuit 108 are arranged similarly as in the speed conversion section in FIG. 20; however, the shift register 107 is a 256-bit shift register so as to store the 256-bit data of the sensor array 101. In FIG. 30, reference character D designates data; ST, a start signal; CLK, a clock input; and RDYW, a signal whose level is set to "0" only when the start signal ST is at "1" and the ready signal RDY in FIG. 20 is at "0", and is set to "1" in the other cases (FIG. 31).

When the start signal ST from a sequence control section (described later with reference to FIG. 36) is applied to the control logic circuit 108, the sensor array 101 is caused to output the image intensity distribution signal which is accumulated therein in the next accumulation time T as shown in FIG. 21. The signal thus outputted is applied through the low-pass filter 104 and the amplifier 105 to the binary encoder 106, where it is encoded into a binary data which is applied to the 256-bit shift register 107.

When the data of 256 bits has been transferred to the shift register 107, the signal RDYW is raised to "1".

Figure 32:
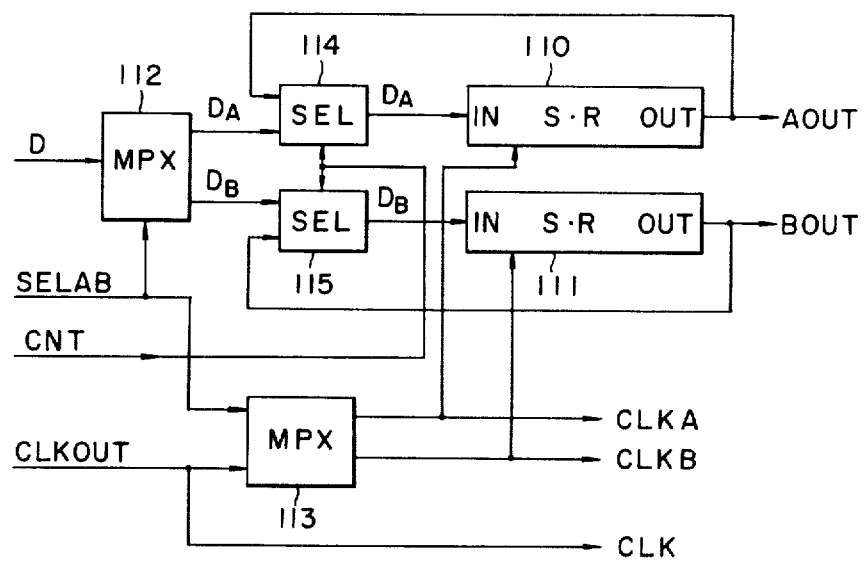

FIG. 32 is a block diagram showing a shift register section which operates to divide the data stored in the shift register 107 into data (or A data) concerning the light beam A and data (or B data) concerning the light beam B.

The shift register section, as shown in FIG. 32, comprises a 128-bit shift register 110 for the A data, a 128-bit shift register 111 for the B data, multiplexers 112 and 113, and selectors 114 and 115.

The multiplexer 112 operates to apply an input data D to the selector 114 when a signal SELAB from the sequence control section (FIG. 36) described later is at "1", and to the selector 115 when the signal is at "0".

The selectors 114 and 115 operate to apply data DA and DB inputted thereto by the multiplexer to the shift registers 110 and 111, respectively, when a signal CNT from the sequence control section (described later) is at "1". Furthermore, the selectors 114 and 115 operate to return the data which are provided at the output sides (out) of the shift registers 110 and 111 to the input sides (in) of the same, respectively, when the signal CNT is at "0".

The multiplexer 113 receives a clock pulse CLKOUT from a clock pulse generating section (FIG. 35) described later, and applies a clock pulse CLKA to the shift register 110 and a correlator 120 (FIG. 33) described later when the signal SELAB is at "1", and a clock pulse CLKB to the shift register 111 and the correlator 120 (FIG. 33) when the SELAB is at "0".

Therefore, with the signal CNT at "1", the signal SELAB is raised to "1", so that the data D stored in the shift register 107 in FIG. 30 is transferred through the multiplexer 112 and the selector 114 to the shift register 110. When 128 clock pulses CLKOUT are applied to the multiplexer 113, the first half of the data in the shift register, i.e. the A data DA of 128 bits is transferred to the shift register 110.

Then, the signal SELAB is set to "0", and when 128 clock pulses CLKOUT are further applied to the multiplexer 113, the second half of the data in the shift register, i.e. the B data DB of 128 bits is transferred to the shift register 111.

After that A data DA and the B data DB each having 128 bits have been provided in the shift registers 110 and 111, respectively, the signal CNT is set to "0", so that the selectors 114 and 115 are switched so as to return the data from the output sides (out) of the shift registers 110 and 111 to the input sides (in). Thereafter, with the aid of the clock pulses CLKA and CLKB, the relevant data are supplied to the correlator 120 (described later) by the shift registers 110 and 111, respectively.

Figure 33:
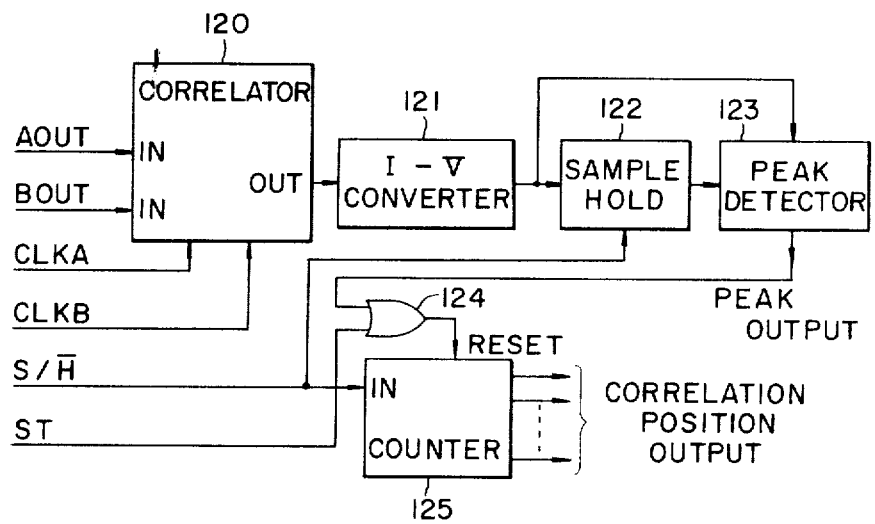

FIG. 33 is a block diagram showing a correlation position detecting section. This section comprises a correlator 120, a current-to-voltage converter (I-V converter) 121, a sample hold circuit 122, a peak detector 123, an OR gate 124, and a counter 125.

The correlator 120 may be a TC 1004J correlator 120 manufactured by TRW Co., for instance. The correlator is made up of two shift registers, EX-OR circuits for the output bits of the shift registers, and a circuit for subjecting the outputs of the EX-OR circuits to addition, to provide a current value as an output, similarly as in the correlator shown in FIG. 17. As the number of data in the two shift registers which coincide with one another is increased, the number of outputs of the EX-OR circuits which are set to "0" is increased, and the output current is increased. However, it should be noted that each of the two shift registers is of 64-bits.

The operation of transferring data from the shift registers 110 and 111 in FIG. 32 to a register 120A for the A data and a register 120B for the B data in the correlator 120 will be described with reference to FIG. 37.

In this embodiment, similarly as in the operation in which two halves of an image which have been shifted in the opposite directions through image splitting are coincided with each other to detect the focusing, the opposed halves of the A data DA and the B data DB stored in the shift registers 110 and 111 are shifted in the opposite directions bit by bit, to detect the correlation.

More specifically, the 64-bit data of the shift register 110, i.e. the left half of the data of the shift register 110 (indicated as a shaded portion in FIG. 37) and the 64-bit data of the shift register 111, i.e. the right half of the data of the shift register 111 (indicated as a shaded portion in FIG. 37) are transferred to the shift registers 120A and 120B, respectively, for detecting the correlation.

For this purpose, in the first correlation detection, 128 pulses CLKA are applied to the shift registers 110 and 120A, and 64 pulses CLKA are applied to the shift registers 111 and 120B.

When 128 pulses CLKA are applied to the shift register 110, all the data are transferred to the shift register 120A, and are returned back to the shift register 110. Thus, the shift register stores the A data under the same condition as the initial condition. Since the capacity of the shift register 120 is only 64 bits, the first half 64-bit data is eliminated by being pushed out of the register, and therefore the second half 64-bit data, i.e. only the A data (indicated as a shaded portion in FIG. 37) is stored.

On the other hand, when 64 pulses CLKB are applied to the shift register 111, the right half of the data (indicated as a shaded portion in FIG. 37), i.e. the B data of 64 bits is transferred to the shift register 120B. Therefore, in the shift register 111, the data which was in the left half position is stored in the right half position, and the data which was in the right half position is stored in the left half position.

In the second correlation detection, 127 pulses CLKA are applied to the shift register 110, and one pulse CLKB is applied to the shift register 111.

As a result, the A data of 64 bits which is shifted by one bit to the right when compared with its state in the shift register 110 in the first correlation detection (as indicated by the phantom line in FIG. 37) is transferred to the shift register 120A. On the other hand, the B data of 64 bits which is shifted by one bit to the left when compared with its state in the shift register 111 in the first correlation detection is transferred to the shift register 120B.

Thus, in and after the second correlation detection, 127 pulses CLKA are applied to the shift registers 110 and 120A, and one pulse CLKB is applied to the shift registers 111 and 120B, to carry out the correlation detection sixty-four times. That is, the data indicated as the shaded portions in FIG. 37 are shifted in the opposite directions bit by bit until the data are completely in opposed states, to detect all the correlations.

In the thirty-second correlation detection, the correlation of the A data of 64 bits and the B data of 64 bits approximately in the central positions in the shift registers 110 and 111 (as indicated by the broken lines in FIG. 37) is detected. If, in this detection, the output of the correlator 120 is maximum, the photographing lens is in focus. If the correlation output is maximum in a correlation detection other than this correlation detection, then the photographing lens is out of focus as much.

Referring back to FIG. 33, the output current of the correlator 120 in each correlation detection is converted into a voltage by the I-V converter 121, and the voltage is applied to the sample hole circuit 122 and the peak detector 123.

Whenever the data of the shift registers 120A and 120B in the correlator 120 are correlated, a sampling signal S/H from the sequence control section (FIG. 36) described later is raised to "1", so as to sample an input signal to the sample hold circuit 122 from the I-V converter 121, so that when the sample value is higher than the preceding hold value, the hold value is renewed, and when the sample value is lower than the preceding hold value, the hold value is held as it is.

Therefore, for instance in the case where the sample values in the correlation detections are varied as indicated by the solid line in FIG. 38, the hold value follows the sample value while the latter is being increased; however, after the increase of the sample value reaches a peak value, the peak value is held as indicated by the broken lines in FIG. 38 until a sample value higher than the peak value is provided.

In the peak detector 123, the hold value in the sample hold circuit 122 is compared with the input signal (corresponding to the sample value in FIG. 38) from the I-V converter 121, and when the input signal value is larger than the hold value, the peak output is raised to "1". The peak output "1" is applied through the or gate 124 to the counter 125 to reset the latter 125.

Therefore, the counter 125 is maintained reset as indicated in FIG. 38 until the correlation output reaches a peak value. Thereafter, the counter 125 counts the sampling signal S/H; however, it is reset again when the correlation output reaches a peak value which is larger than the preceding peak value. When the sixty-fourth sampling, or the sixty-fourth correlation detection has been achieved, the count value which is obtained by counting the sampling signal after the occurrence of the maximum peak value is held in the counter 125. This count value is outputted, as a correlation position data, by the counter 125.

This count value of the counter is reset for the time interval which elapses after the start signal ST is raised to "1", i.e. the data accumulation of the sensor array 101 is started, until the time instant that the data are transferred to the shift registers 110 and 111.

FIG. 34 is a block diagram showing a motor drive and display section. This section comprises a latch circuit 130, a magnitude comparator (or a digital comparator) 131, and LED (light emitting diode) and motor driver 132.

The latch circuit 130 latches the correlation position data which is outputted as the counter value of the counter 125 described above, when the signal STRB from the sequence control section (FIG. 36) is raised to "1".

The magnitude comparator 131 is set to a value thirty-two (32). In the magnitude comparator 131, the correlation position data latched by the latch circuit 130 (hereinafter referred to as a "a correlation position data N" when applicable) is compared with (32). If N>32, an output a of the comparator 131 is raised to "1"; if N<32, an output b of the comparator 131 is raised to "1"; and if N=32, an output c of the comparator 131 is raised to "1".

The LED and motor driver 132 operates to rotate the motor 133 in one direction and to turn on a light emitting diode L1 indicating the front focus when the output a described above is at "1"; and to rotate the motor in the opposite direction and to turn on a light emitting diode L2 indicating the rear focus when the output b is at "1".

Thus, the photographing lens (not shown) is moved to be in focus by the rotation of the motor. When the photographing lens is focused on the object, the output c of the magnitude comparator 131 is raised to "1", as a result of which the motor 133 is braked and a light emitting diode L3 is turned on to indicate the focusing.

During the motor driving operation, the above-described sequence is repeatedly carried out, so that in a motion picture camera or a video camera the focus adjustment is carried out following the movement of an object at all times. In the case of a still camera, the shutter can be released after the light emitting diode indicating the focusing has been turned on.

After the motor has been rotated in the required direction, the motor can be stopped by detecting the focusing by using a contrast check circuit as shown in FIG. 28.

If an automatic/manual change-over switch 134 (FIG. 34) is turned off, the motor 133 is not rotated, and one of the light emitting diodes is turned on. Therefore, in this case, the photographing lens can be manually focused on an object with the focusing checked.

FIG. 35 is a block diagram showing a clock pulse generating section. This section comprises a latch circuit 140 for latching a preset numerical value (n), a counter 141, a clock pulse oscillator 142, a one-shot multivibrator 143, a group of EX-OR circuits 144 for the output bits of the latch circuit 140 and the counter 141, an OR circuit 145 for receiving the outputs of the EX-OR circuits 142, and an AND gate 146.

In order to supply clock pulses CLKOUT as many as necessary for the operations of the above-described various circuit elements, the necessary number is given, as a preset value, by the sequence control section (described later). When a signal BGN is raised to "1", the one-shot multivibrator 143 is triggered by the rise of the signal BGN, the output of the one-shot multivibrator 143 is latched by the latch circuit 140, and the counter 141 is reset.

At the same time, the output of the OR circuit 145 is set to "1", and while the output clock pulse of the clock pulse oscillator 146 is provided through the AND gate 146, the output clock pulse is counted by the counter 141.

When the count value of the counter 141 reaches the preset value latched in the latch circuit 140, all of the outputs of the EX-OR circuits 144 are set to "0". As a result, the output of the OR circuit 145 is set to "0", to close the AND gate 146, and therefore the delivery of the clock pulse is suspended.

The output of the OR circuit 145, i.e. a signal BSY, is maintained at "1" while the clock pulse is being delivered so as to stop the advancement of the sequence of the sequence control section (FIG. 36) described later.

Figure 36:
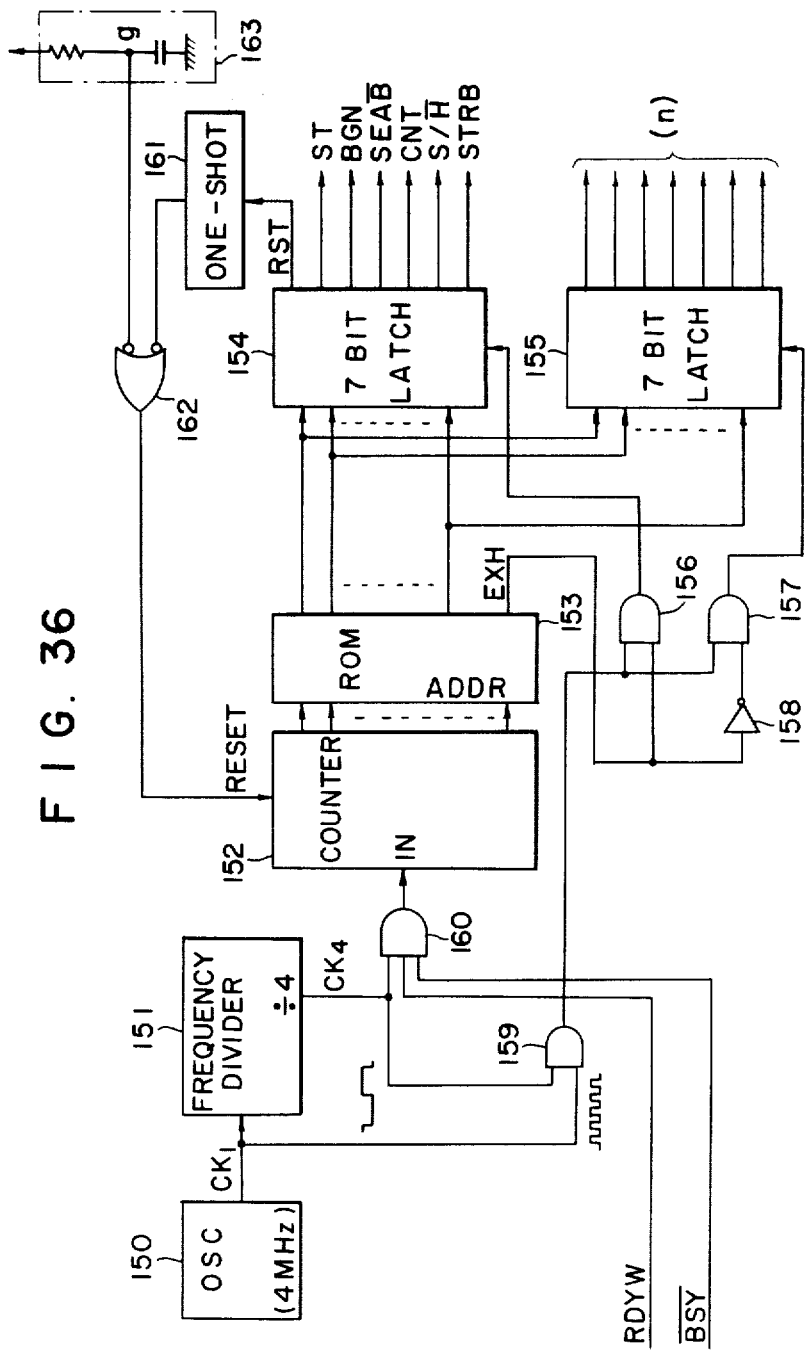

The above-described operations in the various circuit elements are controlled by the sequence control section shown in FIG. 36.

The sequence control section comprises a 4-MHz oscillator 150, a frequency divider 151 for subjecting the output of the oscillator 150 to 174 frequency division, a counter for counting the output of the frequency divider 151, a read-out memory (ROM) 153 which is addressed by the count value of the counter 152 and 7-bit latch circuits 154 and 155 for latching the output data on the ROM 153.

The data of operating signals necessary for the sequence control and the data of the preset value which is to be applied to the above-described clock pulse generating section are stored in 8-bit memories by using seven bits beginning with the 0-th address, and a signal EXH for selecting the latch circuits 154 and 155 is stored by using the remaining one bit. The operating signals RST, ST, BGN, SELAB, CNT, S/H and STRB are each stored, as "1" or "0", in one of the seven bits.

An address in the ROM 153 is specified according to the count value of the counter 152, so that the data in the address thus specified is read out. If the signal EXH is at "1", an AND gate 156 is opened, so that the data thus read is latched by the latch circuit 154 with the timing that the output of an AND gate 159 is raised to "1". When the signal EXH is at "0", the output of an inverter 158 is raised to "1" to open an AND gate 157, so that the data read out is latched by the latch circuit 155.

After the counter 152 has counted up, there is a little time before all the data in an address newly specified are provided at the output of the ROM 153. Therefore, the counter 152 is counted up with the fall of a pulse signal CK4 which is obtained by subjecting the 4-MHz pulse signal CK1 of the oscillator 150 to ¼ frequency division, and the pulse signal CK4 and the 4-MHz pulse signal are applied to the AND circuit 159. When the output of the AND circuit 159 is raised to "1", i.e. after a half period of the pulse signal CK4, the latch circuit 154 or 155 is strobed.

When the above-described signal RDYW is at "0", i.e. for the time interval which elapses from the start of the data accumulation of the sensor array 101 in the data detecting section in FIG. 30 until the data have been transferred to the shift register 107, the AND gate 160 is maintained closed. Furthermore, in the case when the signal BSY from the above-described clock pulse generating section is at "1", and its inverted signal BSY is at "0", the AND gate 160 is closed, to prevent the count-up of the counter 152, thereby to stop the advancement of the sequence.

When the signal RST is raised to "1", the output of the one-shot multivibrator 161 is set to "0" in a short time. This output is applied through an inversion input type OR circuit 162 to the counter 152 to reset the latter 152. When the power switch is turned on, a point g in an initial reset circuit 163 is at "0". This low level data "0" is applied through the OR circuit 162 to the counter 152 to reset the latter 152.

As is apparent from the above description, according to the automatic focus adjusting method of the invention, the optimum focusing position is detected from the phase and intensity distribution of an object's image which is formed by the photographing lens, to focus the photographing lens on the object. Therefore, a camera utilizing the method of the invention is free from parallax. The method of the invention is applicable to a camera using a variable focal distance photographing lens, with high accuracy in focusing. Furthermore, movable members for detecting the focus may be eliminated from the optical system. Especially in the case where the method of the invention is applied to a video camera, the video signal of the image pickup tube or the image pickup element can be used as one or both of the correlation position detecting data. Thus, the method of the invention can be readily practiced.

What is claimed is:

1. An automatic focusing device for use with a photographing device having a photographing optical system, the automatic focusing device comprising: detecting means for detecting as video signals the intensity distributions of the images on an image pickup plane of an object to be photographed which are formed by different light beams passing through different portions of a photographing optical system of a photographing device, the detecting means comprising a detecting array disposed at a position in conjugation with the position of said image pickup plane for receiving a light beam picked up from said photographing optical system;

light beam splitting means interposed in said photographing optical system for splitting the light beam in said photographing optical system into said different light beams which are applied to said detecting means;

signal processing means for receiving and processing a relative positional relation of said video signals and producing a corresponding output signal; and driving means for driving said photographing optical system or said image pickup plane to the focusing position of said object irrespective of the focal distance of said photographing optical system according to an output signal of said signal processing means.

2. A device as claimed in claim 1, in which said driving means includes means for automatically driving said photographing optical system or said image pickup plane in accordance with said output signal.

3. A device as claimed in claim 1, in which said signal processing means includes means for analyzing and processing the video signals to calculate both a direction in which said photographing optical system or said image pickup plane should be moved and an amount of movement thereof to the focusing position of said object.

4. A device as claimed in claim 1, in which said signal processing means includes means for analyzing and processing the video signals to calculate a direction in which said photographing optical system or said image pickup plane should be moved.

5. A device as claimed in claim 1, in which said signal processing means includes means for analyzing and processing the video signals to decide only the direction of movement of said photographing optical system or said image pickup plane, while said photographing optical system is controlled to move to a position where the contrast of the image of said object on said image pickup plane is maximum.

6. A device as claimed in claim 1, in which said detecting means is an image pickup tube with a pair of blanking parts which simultaneously receives two light beams which pass different portions of a focus lens in said photographing optical system.

7. A device as claimed in claim 1, including means for alternately applying said different light beams passing through said different portions of said photographing optical system to said detecting array so that the intensity distributions of the images of said object which are formed by said different light beams are converted into electrical signals.

8. A device as claimed in claim 7, in which said means for alternately applying said different light beams comprises a liquid crystal shutter.

9. A device as claimed in claim 7, in which said means for alternately applying said different light beams comprises a polarization filter.

10. A device as claimed in claim 7, in which said means for alternately applying said different light beams comprises a color division filter.

11. A device as claimed in claim 7, in which said means for alternately applying said different light beams comprises a synchronously-controlled mechanical blade mechanism.

12. An automatic focusing device comprising:
   a zoom lens system including means for forming a path of substantially parallel rays in a photographing optical system when a photographing lens is focused on an object to be photographed;
   a prism spectroscope with a half-mirror surface disposed in the path of said parallel rays;
   shielding means for preventing the interference of said two light beams which are split by said half-mirror surface of said prism spectroscope;
   a pair of detecting arrays disposed at a position in conjugation with the position of the image pickup plane of said photographing optical system, so as to simultaneously receive two light beams which pass through different portions of a focus lens in said photographing optical system and are split by said half-mirror surface;
   signal processing means for receiving and processing a relative positional relation of two video signals corresponding to the intensity distributions of the images of said object which are detected by said pair of detecting arrays and producing a corresponding output signal; and
   drive means for moving said photographing optical system or an image pickup plane to the focusing position of said object according to an output signal of said signal processing means.

13. An automatic focusing device comprising:
   a detecting array for detecting the intensity distribution of the image of an object to be photographed which is formed by a light beam passing a predetermined portion of a photographing optical system and producing a video signal corresponding to said intensity distribution;
   an image pickup tube having an image pickup surface on which the image of said object is formed by the entire light beam passing said photographing optical system;
   extracting circuit means for extracting a video signal corresponding to the intensity distribution of a part corresponding to said detecting array of the image of said object which is formed on said image pickup surface;
   signal processing means for comparing and processing a relative positional relation of said video signals corresponding to said two intensity distributions and producing a corresponding output signal; and
   drive means for moving said photographing optical system to the focusing position of said object according to an output signal of said signal processing means.

14. A device as claimed in claim 13, in which said signal processing means includes means for analyzing and processing said video signals to calculate both a direction in which said photographing optical system should be moved and an amount of movement thereof to the focusing position of said object.

15. A device as claimed in claim 13, in which said signal processing means includes means for analyzing and processing said video signals to calculate a direction in which said photographing optical system should be moved.

16. A device as claimed in claim 13, in which said signal processing means includes means for analyzing and processing said video signals to determine only the direction of movement of said photographing optical system and to move said photographing optical system until the contrast of an image formed by a video signal of said image pickup tube becomes optimum.

17. A device as claimed in claim 13, in which said driving means includes means for automatically driving said photographing optical system in accordance with said output signal.

18. An automatic focusing device comprising:
   a zoom lens system including means for forming substantially parallel rays in a photographing optical system when a photographing lens is focused on an object to be photographed;
   a spectroscope with a pair of half-mirror surfaces disposed in the path of said parallel rays;
   an image pickup tube with a pair of blanking parts which simultaneously receives two light beams which pass different portions of a focus lens in said photographing optical system and, after being split by said half-mirror surfaces, directed in parallel with the optical axis of said photographing optical system;
   signal processing means for detecting and processing the intensity distributions of the images which are formed on said blanking parts by said two light beams and producing a corresponding output signal; and
   drive means for moving said photographing optical system to the focusing position of said object according to an output signal of said signal processing means.

* * * * *